United States Patent [19]
Giuliano

[11] Patent Number: 5,490,447
[45] Date of Patent: Feb. 13, 1996

[54] AUTOMATIC ESPRESSO AND CAPPUCCINO MACHINE

[75] Inventor: Mario Giuliano, Cuneo, Italy

[73] Assignee: Faema S.p.A., Cuneo, Italy

[21] Appl. No.: 142,220

[22] Filed: Oct. 26, 1993

Related U.S. Application Data

[63] Continuation-in-part of Ser. No. 761,366, Aug. 23, 1991, Pat. No. 5,265,520.

[51] Int. Cl.⁶ .................................................. A47J 31/00
[52] U.S. Cl. ........................ 99/286; 99/287; 99/289 R; 99/289 P; 99/302 R
[58] Field of Search ............................. 99/279, 280, 281, 99/282, 285, 286, 287, 289 R, 289 T, 289 D, 289 P, 295, 297, 299, 300, 302 R; 426/433

[56] References Cited

U.S. PATENT DOCUMENTS

| | | | |
|---|---|---|---|
| 2,906,193 | 9/1959 | McCauley | 99/286 |
| 3,254,589 | 6/1966 | Little | 99/289 |
| 4,421,014 | 12/1983 | Vicker | 99/289 P |
| 4,715,274 | 12/1987 | Paoletti . | |
| 4,735,133 | 4/1988 | Paoletti . | |
| 4,779,519 | 10/1988 | Giuliano . | |
| 4,800,805 | 1/1989 | Mahlich et al. . | |
| 4,945,824 | 8/1990 | Borgmann . | |
| 5,158,793 | 10/1992 | Helbling | 99/289 R |

FOREIGN PATENT DOCUMENTS

| | | |
|---|---|---|
| 0326929 | 9/1989 | European Pat. Off. . |
| 0344859 | 12/1989 | European Pat. Off. . |
| 9000122 | 1/1991 | European Pat. Off. . |

*Primary Examiner*—Robert W. Jenkins
*Attorney, Agent, or Firm*—Holland & Knight

[57] ABSTRACT

An automatic espresso and cappuccino machine comprises a number of individual filter units movable with respect to a coffee filling station, a coffee dispensing station, a filter cleaning station and a filter washing station. Ground coffee is introduced into each filter unit at the coffee filling station and then the filter units are selectively rotated by a filter indexing device to the coffee dispensing station where they are moved into engagement with a water nozzle which first compacts the coffee and then directs heated water through the ground coffee to form espresso. An emulisifier is also located at the coffee dispensing station, which is effective to produce foamed milk for combination with the espresso to form cappuccino. After the brewing operation is completed, the filter units are first transported from the coffee dispensing station to the filter cleaning station where the cake or layer of coffee grounds is removed and allowed to fall by gravity into a waste container, and then to the filter washing station where a spray of water removes any grounds remaining within the filter units.

64 Claims, 11 Drawing Sheets

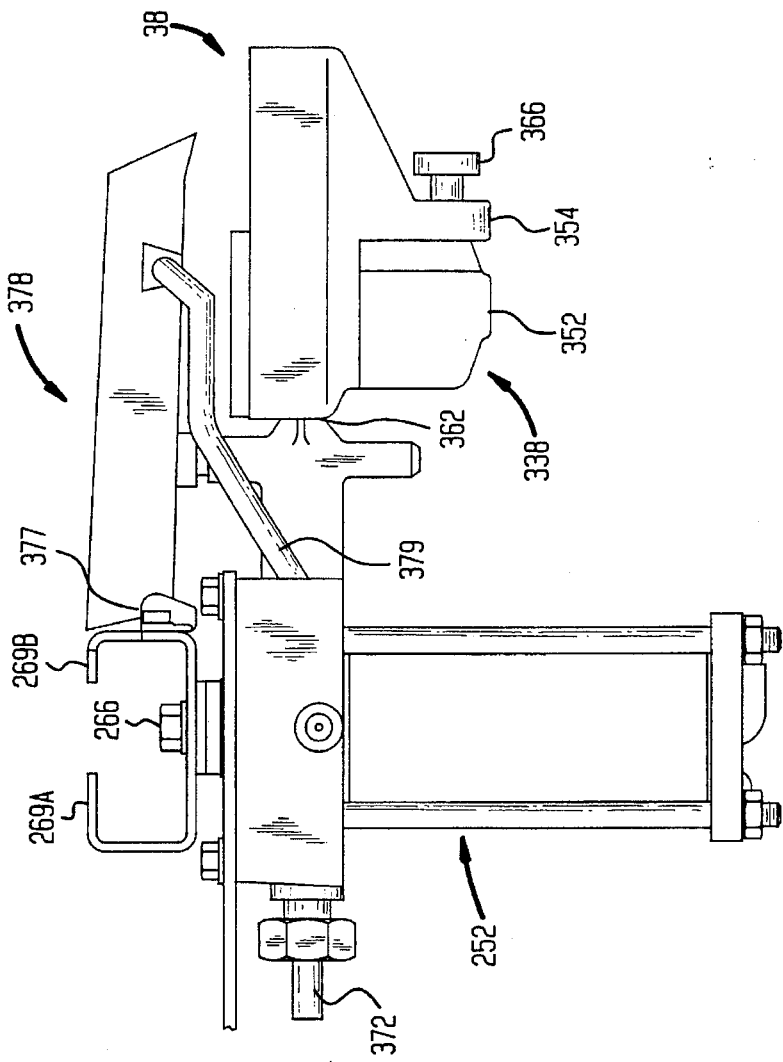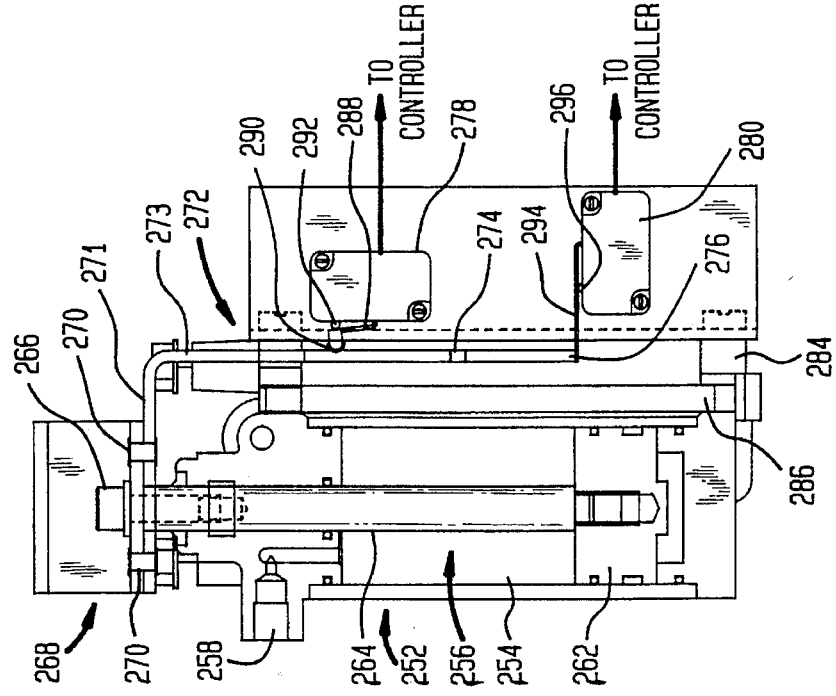

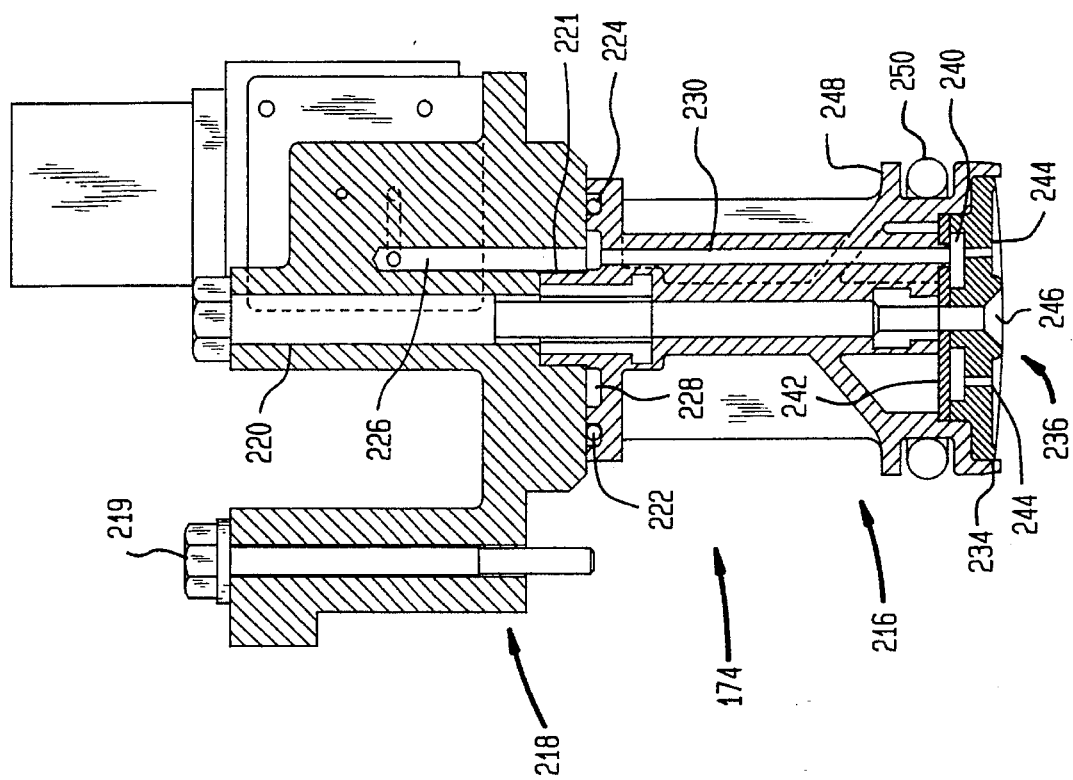
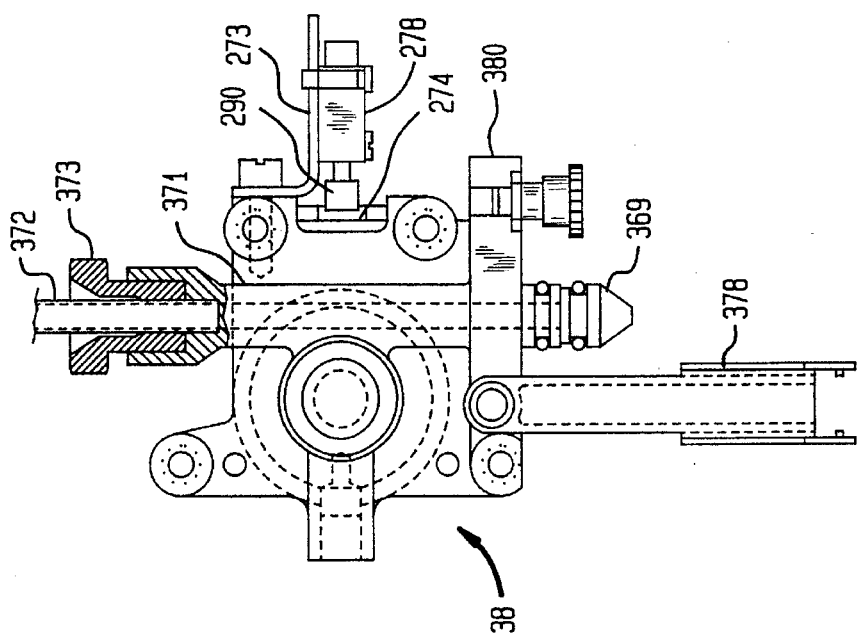

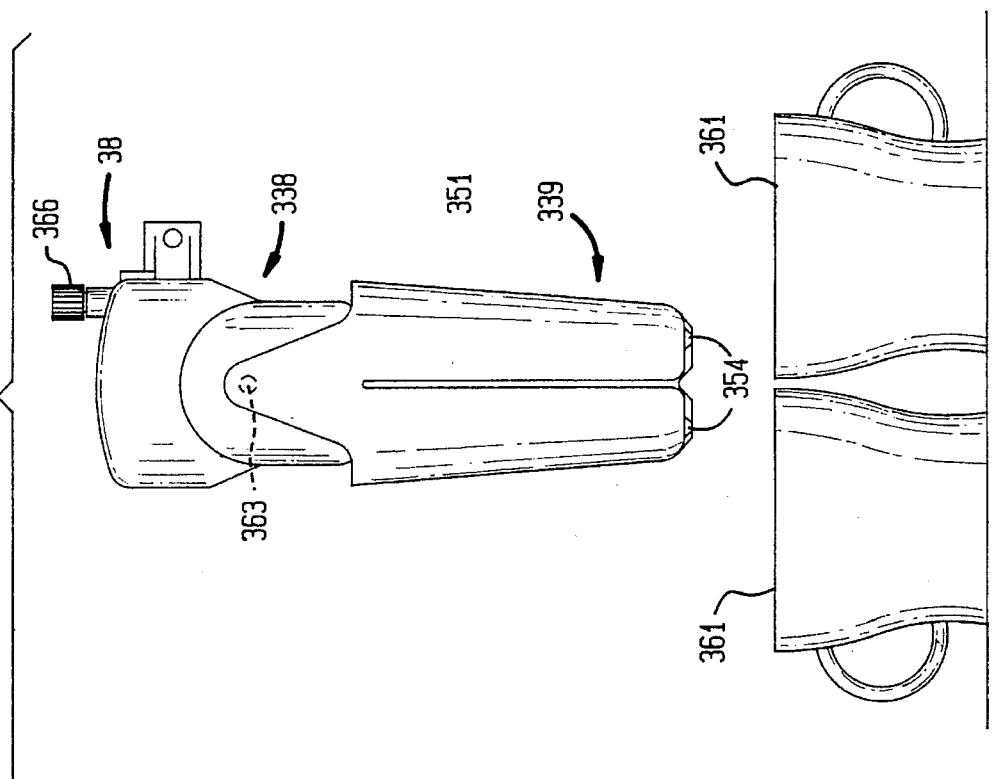
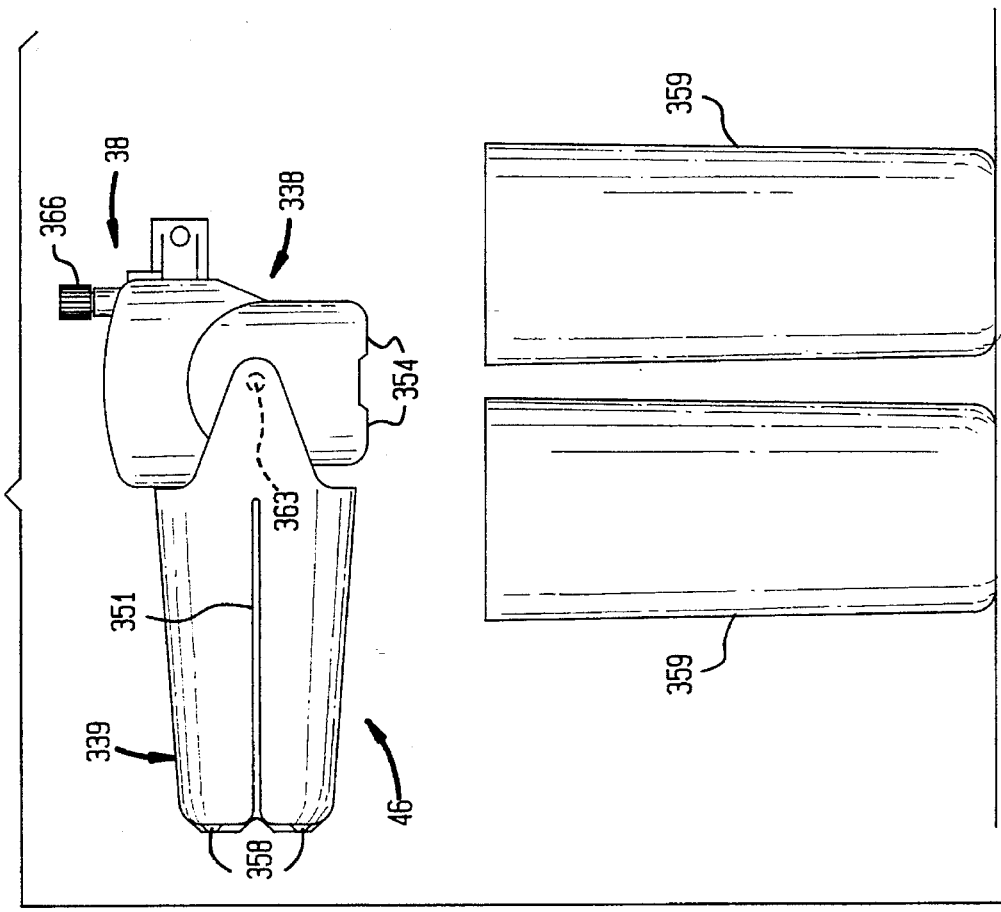

1

AUTOMATIC ESPRESSO AND CAPPUCCINO MACHINE

This application is a Continuation-in-Part of U.S. patent application Ser. No. 07/761,366, entitled "An Automatic Machine for Dispensing Black Coffee, White Coffee and the Like" to Giuliano, filed Aug. 23, 1991 now U.S. Pat. No. 5265520 and owned by the assignee of this invention.

FIELD OF THE INVENTION

This invention relates to automatic espresso and cappuccino machines, and, more particularly, to a fully automated apparatus for producing espresso and/or cappuccino of different types without operator intervention.

BACKGROUND OF THE INVENTION

Espresso and cappuccino are beverages widely enjoyed in Europe, and are gaining increased acceptance in the United States at this time. Unlike the percolated and drip-brewed coffee most commonly made in America, espresso is made by directing heated water, under pressure, through a layer of compacted ground coffee resting atop a filter disc carried within a filter holder. The ground coffee is placed into the filter holder from a grinder, compacted against the filter disc and then the filter holder is detachably mounted to the espresso machine in preparation for a brewing operation. The residence time of the water within the ground coffee is typically on the order of 20 to 30 seconds to produce brewed coffee or espresso having a taste many Americans find to be "stronger" than percolated or drip-brewed coffee, but which actually has about half the caffeine content.

Cappuccino is usually made by first brewing espresso as described above, and then pouring a layer of foamed milk over the espresso in the cup. In order to make the foamed milk, air is intermixed with the milk in the presence of steam so that the milk is "emulsified," i.e. foamed or frothed, and heated at the same time. The production of foamed milk for cappuccino has evolved over the decades with an emphasis on making the process more automatic and less dependent on the skill of the operator. This is particularly true in the home cappuccino market, and also in markets such as the United States where there are comparatively few skilled operators and limited training of new ones.

The earliest method of making cappuccino involved equipping an espresso machine with a tube connected to a source of steam. In order to make foamed milk with this type of system, the operator places the steam tube into a container of milk, turns on the steam, and then manipulates the container by hand, e.g. in a swirling and/or up-and-down motion, to introduce air into the milk. The steam assists in intermixing the air and milk within the container, and also heats the milk to form a quantity of emulsified or foamed milk which is then poured into a cup containing espresso. This is still the predominant method of making foamed milk in the commercial markets in Europe, but involves a reasonable degree of skill on the part of the operator to avoid splattering of the milk as it is being foamed, burning of the milk and/or the production of foamed milk having less than the desired consistency.

In an effort to simplify the above-mentioned method of making foamed milk, and require less operator skill, apparatus were developed such as disclosed, for example, in U.S. Pat. Nos. 4,735,133 to Paoletti; 4,800,805 to Mahlich, et al.; and 4,945,824 to Borgmann. The foaming apparatus of the type disclosed in these patents includes a steam tube connected at one end to a source of steam and having a discharge outlet at the opposite end, and an air tube having an inlet open to atmosphere and an outlet located near the discharge outlet of the steam tube. The tubes are first inserted within a container of milk, and then the supply of steam is activated so that a flow of steam is introduced through the steam tube. In the course of passage of the steam through the steam tube, a suction is created within the air tube which draws air through such tube and into the container of milk where it is agitated and intermixed with the milk and steam to form heated, foamed milk. In devices of this type, the operator need not manipulate the container of milk to introduce air into the milk because the air is drawn into the milk by the suction developed from the flow of steam. While an improvement over the earlier foaming devices incorporating only a steam tube, it has been found that use of the above-described devices can result in the production of unacceptable foam, e.g. with large bubbles or the like, unless the operator is relatively skilled. Additionally, the milk must be poured into a container and placed under the tube by the operator in order to obtain the foamed milk, and this is labor-intensive and inefficient.

In order to further reduce operator intervention in the making of cappuccino, automatic milk emulsifiers have been developed as disclosed, for example, in U.S. Pat. Nos. 4,715,274 to Paoletti and 4,779,519 to Giuliano. The emulsifier units disclosed in each of these patents eliminate the need for an operator to manipulate or hold a container of milk at all. Such emulsifiers operate by injecting a jet of steam into the interior of the emulsifier housing creating a vacuum which draws a quantity of milk and air therein. The air enters the emulsifier housing through an inlet open to atmosphere, and the milk is drawn from a container through a tube connected to the emulsifier. The air and milk are intermixed and heated within an emulsifying chamber contained within the emulsifier housing. The emulsifying chamber has an outlet through which the foamed milk is transmitted into a container, and then the foamed milk is poured by the operator into a cup containing espresso to make the finished cappuccino. Despite eliminating the need for an operator to in any way manipulate a milk container in order to form the foamed milk, such emulsifier units nevertheless require a separate operation to collect the foamed milk and then pour it into a cup containing espresso to make cappuccino.

This problem has been addressed in U.S. patent application Ser. No. 07/761,366 mentioned above, which is the United States National Phase of PCT Application No. PCT/EP90/00122 entitled "An Automatic Machine for Dispensing Black Coffee, White Coffee, and the Like". In this apparatus, the operator merely places a cup under a discharge spout, touches a control button and separate or combined flows of espresso and foamed milk are deposited directly into the same cup. The foamed milk can be provided by an emulsifier unit such as those disclosed in U.S. Pat. Nos. 4,715,274 and 4,779,519 discussed above, or, alternatively, by any other device capable of making suitable foamed milk. Espresso is obtained from a standard filter unit including a filter holder of the type described above which receives ground coffee from a grinder and is releasably mounted to the apparatus. Preferably, the discharge spout includes separate passageways or tubes for the espresso and foamed milk, located side-by-side, so that both the foamed milk and espresso can be directed into the same cup without operator intervention.

It has been recognized that even with automatic cappuccino machines, the operator must nevertheless manipulate the coffee filter unit by hand, including placing the filter holder into a grinder to receive ground coffee, compacting the ground coffee within the filter holder atop the filter disc, and then placing the filter holder in position on the espresso machine to receive heated water to make espresso. While it take less skill to perform these operations, compared to that of foaming the milk, such hand operations nevertheless increase the time required to make cappuccino and involve at least some level of skill. This can be of particular concern in high volume operations such as restaurants, coffee shops and the like wherein speed of production and consistency of the finished product are particularly important.

SUMMARY OF THE INVENTION

It is therefore among the objectives of this invention to provide an apparatus for making espresso and cappuccino which performs every operation associated with making espresso and foamed milk fully automatically, which produces a consistent quality of espresso and cappuccino, which is capable of producing different types of espresso and cappuccino and which is consistent and reliable in operation.

These objectives are accomplished in an automatic espresso and cappuccino machine in which a number of individual filter units are movable with respect to a coffee filling station, a coffee dispensing station and a filter cleaning station. Ground coffee from grinders located at the coffee filling station is deposited into the open top of each filter unit and rests atop a filter disc carried therein. Each filter unit is then selectively rotated by a filter indexing device to the coffee dispensing station where the filter unit is moved into engagement with a water nozzle. The coffee within the filter unit is first compacted against the filter disc, and then heated water from the water nozzle passes through the coffee and filter to form espresso, which is directed into a discharge spout. An emulsifier is also located at the coffee dispensing station, which is effective to produce foamed milk directed through another portion of the discharge spout for combination with the espresso in a single cup. After the brewing operation is completed, the filter unit is transported from the coffee dispensing station to the filter cleaning station where the cake or layer of coffee grounds is removed and allowed to fall by gravity into a waste container.

This invention is therefore predicated upon the concept of forming one or more cups of espresso and/or cappuccino with as little operator intervention as possible while obtaining a consistent, high quality product. No handling of the ground coffee or milk is necessary except for loading the grinders with coffee beans and interconnecting a container of milk via a tube with the emulsifier at the coffee dispensing station. Otherwise, the only requirement of the operator is to place one or two empty cups beneath the discharge spout of the device to catch the espresso or cappuccino being made.

A number of aspects of this invention enable it to operate essentially completely automatically, and to produce different types of beverages depending upon the requirements of a particular geographical area or a customer's taste. In the presently-preferred embodiment, four separate filter units are carried by the filter indexing device and are selectively moved to each of the three stations mentioned above. Each of the filter units includes a filter holder having an open top or inlet, an outlet and a filter disc mounted between the inlet and outlet. The filter disc of each filter unit is different from the others in at least one respect, i.e. either the apertures of a filter disc have a different diameter than those in the other filter discs, or a different number of apertures are formed in such filter disc. These differences in construction of the filter discs enable different types of coffee to be produced by the apparatus of this invention by the touch of a button.

For example, in many areas of southern Europe, such as Italy, the filter discs are preferably formed with apertures having a diameter of about 0.3 millimeters, whereas northern European coffee is usually made with filter discs having apertures of about 0.4 millimeters. The difference in aperture size, together with different brewing time, i.e., the number of seconds in which water is allowed to pass into the filter holder, produces espresso of different taste, as preferred in these different geographic areas. Additionally, the total number of apertures in the filter discs is varied to allow a single filter unit to make one cup of espresso, or two cups at the same time. Accordingly, the machine of this invention is very versatile, and is capable of making espresso and cappuccino having different taste as required.

In another aspect of this invention, the entire coffee handling process employed in other espresso or cappuccino machines is replaced by a fully automated system from the grinding operation to the disposal of brewed grounds. As mentioned above, the filter indexing device selectively moves each of the filter units initially to the coffee filling station. At that location grinders are operated by an electronic controller to automatically grind the desired amount of coffee and transmit it into the filter holder of a filter unit. The filter unit is then moved to the coffee dispensing station by the filter indexing device where a fluid cylinder lifts the filter holder of the filter unit vertically upwardly into sealing engagement with the water nozzle carried by the housing of the machine. In the course of engagement between the filter holder and water nozzle, the coffee within the interior of the filter holder is compacted against the filter disc in preparation for brewing. Heated water is then transmitted by the water nozzle into the filter holder forming brewed coffee or espresso which exits the outlet of the filter holder and is transmitted by a pivotal channel into the discharge spout of the machine. As discussed above, these operations were previously performed manually, including the coffee grinding and compacting operations, as well as mounting the filter holder to the espresso machine. The aforementioned automatic operation of this invention eliminates the need for the operator to perform these functions, allowing he or she to do other things.

After the espresso or cappuccino is brewed at the coffee dispensing station, the filter indexing device moves the filter unit to a filter cleaning station having a rotatable and vertically reciprocating cleaning blade or auger. Whereas the filter indexing device maintains the filter holder of each filter unit in an upright position at the coffee filling station and at the coffee dispensing station, each filter holder is turned upside down by the filter indexing device in the course of movement to the filter cleaning station. In this inverted position, each filter holder is aligned with the cleaning blade or auger which is moved vertically upwardly into the interior of the filter holder and rotated to dislodge the cake or compacted ground coffee therein. The grounds fall by gravity into a waste container for disposal. The filter holder of each filter unit is then returned to the upright position in the course of movement from the filter cleaning station to the coffee filling station in preparation for another brewing operation.

The milk foaming operation is equally free of operator intervention. A container of milk located within an insulated or refrigerated housing within the machine is connected by a line to the emulsifier located at the coffee dispensing station. The emulsifier is also connected by a line to a boiler or other source of steam associated with the machine. In response to a signal from the electronic controller, a steam valve is opened so that a jet of steam is introduced into the emulsifier. The jet of steam creates a suction within the interior of the emulsifier which draws air and milk into an emulsifying chamber located internally of the emulsifier unit. This forms foamed milk which is transmitted to the discharge spout for delivery into the same cup with the espresso to form cappuccino.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 5 is an elevational view, in partial cross section, of the fluid cylinder and bracket for raising and lowering the filter holders at the coffee dispensing station;

FIG. 6 is a side view of the fluid cylinder and bracket shown in FIG. 5;

FIG. 7 is a plan view of the mechanism shown in FIGS. 5 and 6;

FIG. 8 is a cross sectional view of the water nozzle located at the coffee dispensing station;

FIG. 9A is a front perspective view of the discharge spout shown in FIG. 9, with the spout in a pivoted position;

FIG. 9B is a view similar to FIG. 9A, except with the spout in an extended position;

DETAILED DESCRIPTION OF THE INVENTION

Figure 1:
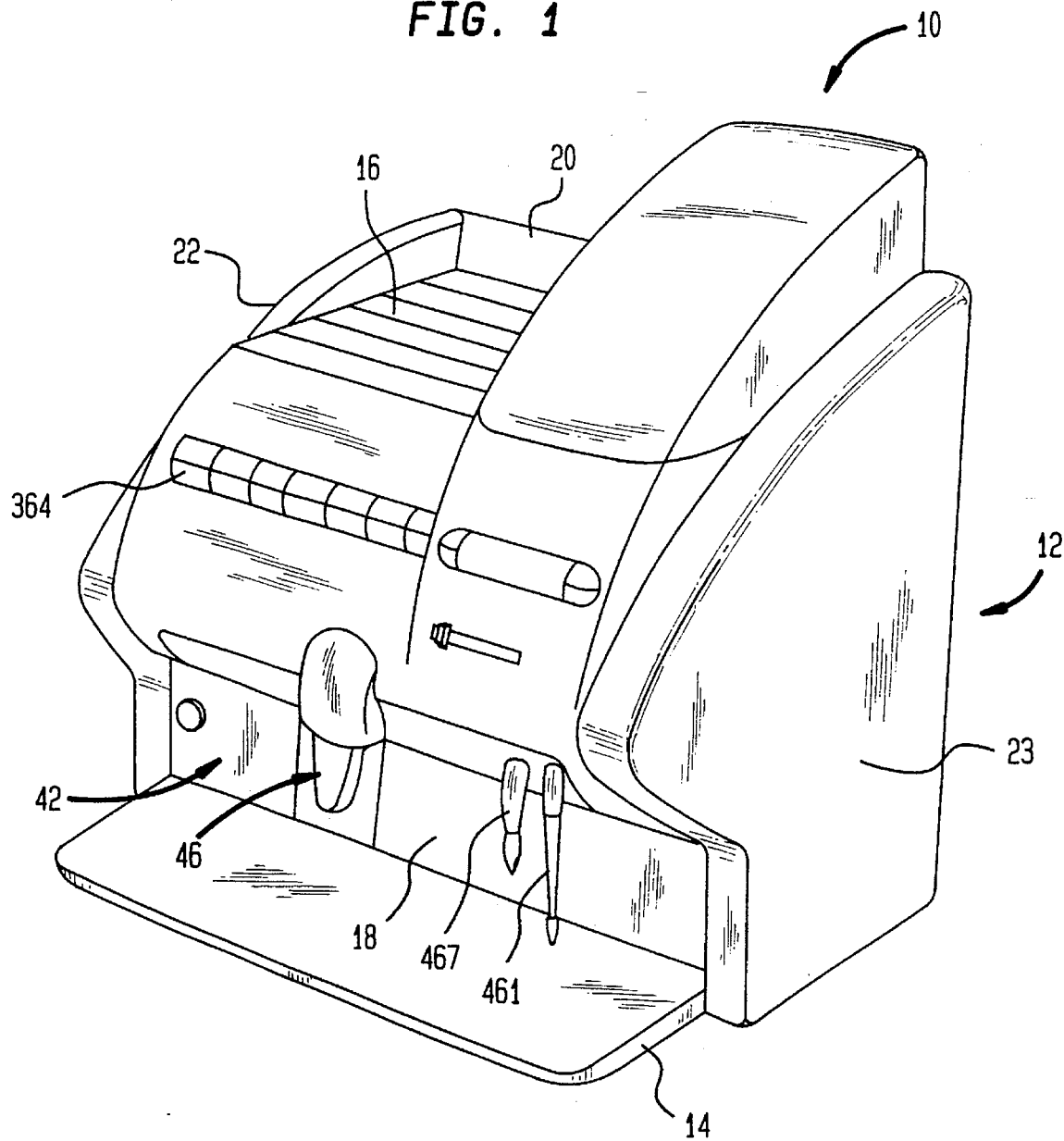
FIG. 1 is a perspective view of the automatic espresso and cappuccino machine of this invention.
Figure 1A:
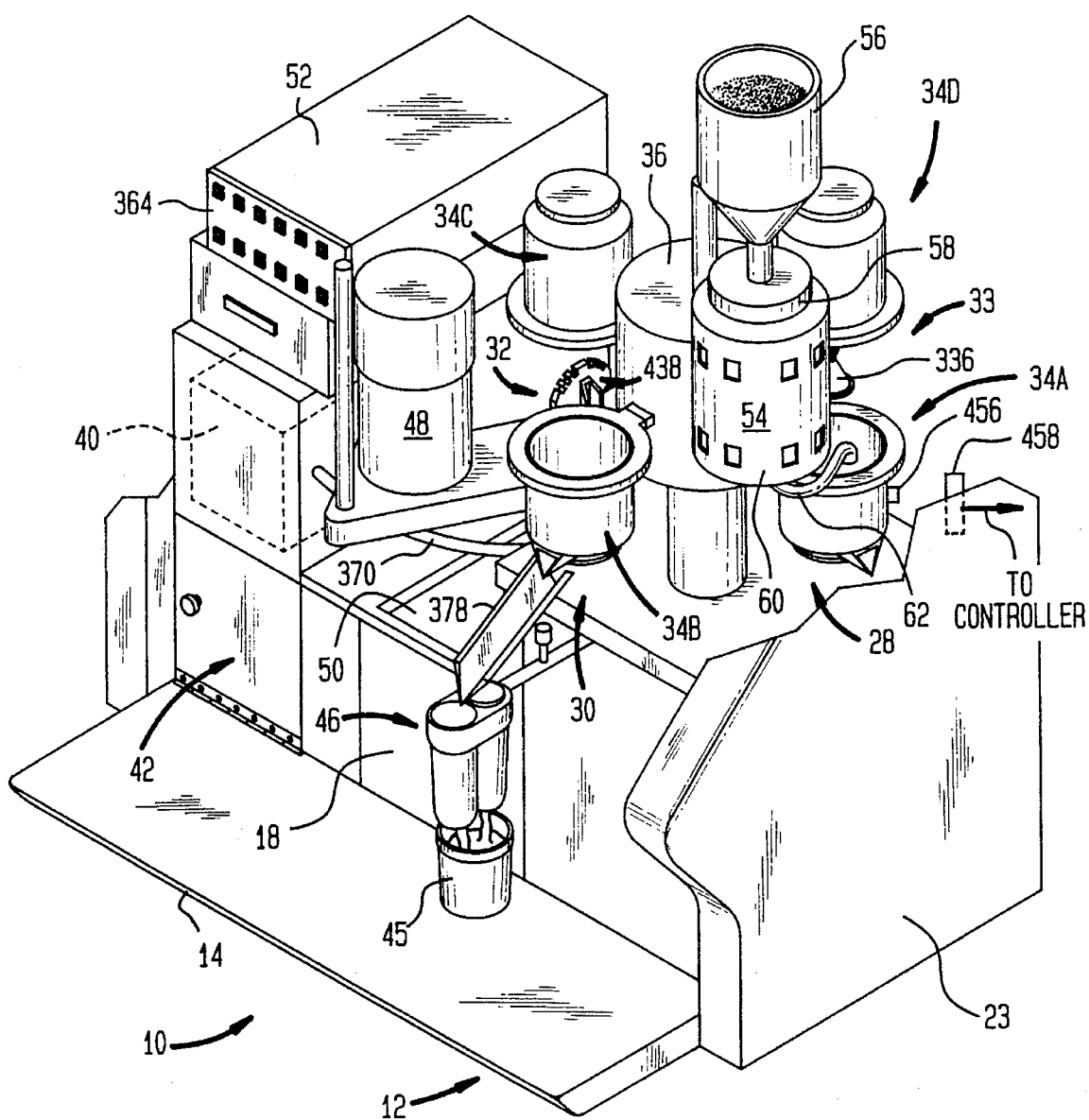
FIG. 1A is a partially cut-away view of the machine shown in FIG. 1.

For purposes of the present discussion, the terms "espresso", "coffee" and "brewed coffee", are used interchangeably to refer to the beverage produced by the passage of heated water, under pressure, through a filter unit in which a quantity of coffee grounds has been compacted atop a filter disc. Depending upon the particular tastes of the consumer, the amount of ground coffee, the quantity of heated water which is allowed to pass through the ground coffee and the residence time of the water within the ground coffee can be varied to obtain brewed coffee or espresso having a different taste. The term "cappuccino" is meant to refer to the combination of espresso or brewed coffee, and foamed milk. Additionally, the term "cappuccino" is meant to be inclusive of a beverage wherein the espresso or brewed coffee is introduced first into the cup and then foamed milk is poured atop the espresso, and a beverage wherein the espresso and foamed milk are poured simultaneously into the same cup where they are intermixed. It should be understood that the apparatus of this invention is capable of making espresso, cappuccino, and, if desired, heated or foamed milk.

As discussed below, "foamed milk" is formed by the intermixture of air and milk in the presence of steam to agitate or froth the milk forming a foam which is heated by the steam. For purposes of the present discussion, the term "foamed milk," "froth" and "emulsified milk" are used interchangeably to refer to the intermixture of air and milk in the presence of steam. The term "emulsifier" or "emulsifier unit" is also used herein to describe the device for making the foamed or emulsified milk. No attempt is made to distinguish between a true emulsion and a foam, and it should be understood that the invention contemplates the formation of either one or both in making cappuccino.

In the following description of the invention, the overall construction of the apparatus is discussed first, followed by a detailed discussion of the various elements herein.
Overall Construction The apparatus 10 of this invention generally comprises a cabinet 12, having a base 14, top wall 16, front wall 18, back wall 20, and side walls 22, 23. A number of vertically upright support rods or columns 24 are mounted within the interior of cabinet 12, only some of which are shown in the Figs., and these columns 24 support a series of horizontally oriented mounting plates 26A–D. As discussed below, various elements of the system are carried by one or more of the mounting plates 26A–E, by the base 14 and/or on the top wall 16.

In the presently preferred embodiment, the apparatus 10 includes a coffee filling station 28, a coffee dispensing station 30, a filter cleaning station 32 and a filter washing station 33 which are spaced from one another within the cabinet 12 as schematically depicted in FIG. 1. A number of filter units 34A–D are selectively movable between each of the stations 28, 30, 32 and 33, by operation of a filter indexing device 36 described in detail below. Depending upon the type and quantity of espresso desired, as described below, one of the filter units 34A–D receives a quantity of ground coffee at the coffee filling station 28 and is then transferred to the coffee dispensing station 30 where a selected type of espresso is brewed. An emulsifier 38 is located at the coffee dispensing station 30 (see FIG. 9) which is connected to a milk container 40 carried within an insulated or refrigerated housing 42 on the base 14 of apparatus 10. The emulsifier 38 receives steam from a boiler 44, mounted to the cabinet base 14, and is operative to produce foamed milk which is directed with the espresso through a discharge spout 46 and into a cup or other container 45.

Once the brewing operation is completed, the filter unit 34A,B,C or D at the coffee dispensing station 30 is then transferred by the filter indexing device 36 to the filter cleaning station 32. The filter cleaning station 32 includes a cleaning device 48 operative to at least partially remove the coffee grounds from the interior of filter units 34A,B,C or D which fall by gravity into a waste container 50 for disposal. The filter unit 34A,B,C or D is then selectively transferred to the filter washing station 33, located opposite the coffee dispensing station 30, where a spray of water is directed into the interior thereof to remove any remaining coffee grounds. Once completely cleaned, the filter unit 34A, B,C or D is then transferred back to the filling station 28, as required, and returned to an upright position thereat.

The various operations of apparatus 10 are all controlled by a programmable controller 52 such as a computer having suitable software. The details of the construction of controller 52 form no part of this invention, and are therefore not discussed in detail herein. As will become apparent below, the software associated with controller 52 is programmed to control all operations at the coffee filling station 28, Coffee dispensing station 30 and filter cleaning station 32, in addition to the hydraulic system and heating elements of the system discussed below in connection with FIG. 10. Such control functions, and the various specific features of this invention, are described in the discussion that follows.

Coffee Filling Station

With reference to FIG. 1, the coffee filling station 28 includes one or two coffee grinders 54, only one of which is shown. Each coffee grinder 54 comprises a hopper 56 for the coffee beans which is preferably mounted to the top wall 16 of the cabinet 12. The hopper 56 feeds the coffee beans into a grinder mechanism 58 which is drivingly connected to a motor 60. The outlet of the grinder mechanism 58 (not shown) is connected to a discharge chute 62, schematically depicted in FIG. 1, which faces downwardly at an angle with respect to horizontal.

In response to a signal from the controller 52, the motor 60 of grinder 54 is activated to operate the grinder mechanism 58 for a predetermined period of time. A desired quantity of ground coffee is then emitted from the grinder mechanism 58 into the discharge chute 62, and then through outlet 64, into one of the filter units 34A–D as described below.

Filters and Filter Indexing Device

Referring now to FIGS. 2A–2E, the filter units 34A–D are illustrated in detail. For purposes of the present discussion, only filter unit 34A is described in detail herein, it being understood that the remaining filter units 34B, C and D are structurally and functionally identical. As described below, the only difference between filter units 34A, B, C and D is the configuration of the filter elements or discs therein to produce different types of espresso and cappuccino.

Figure 2A:
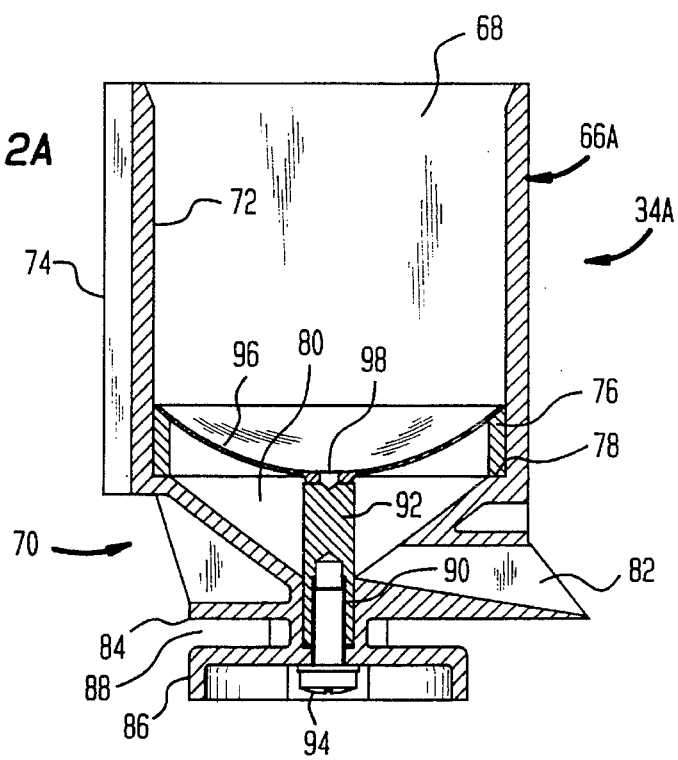
FIG. 2A is a cross sectional view of a filter holder and filter disc herein.
Figure 2B:
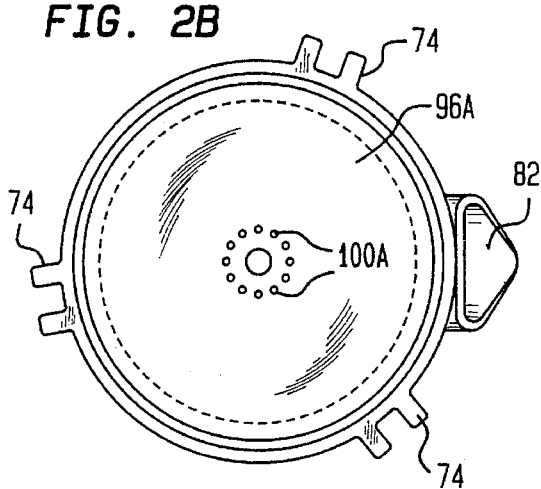
FIGS. 2B–2E are plan views of filter holders having different filter discs.
Figure 2C:
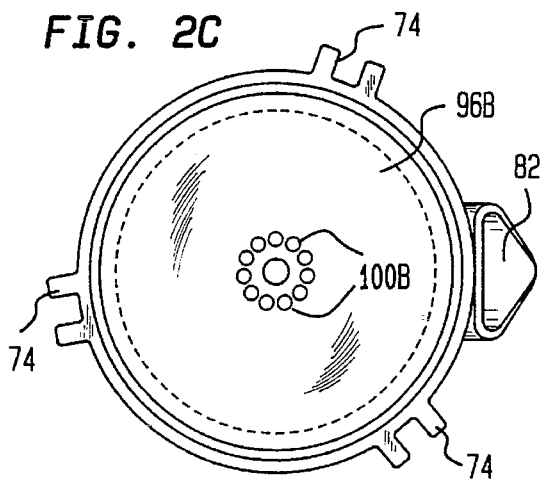

As best shown in FIG. 2A, the filter unit 34A includes a generally cylindrical shaped filter holder 66A, having an open top 68 and a base identified generally with reference number 70. The wall 72 of filter holder 66A is formed with three radially outwardly extending ribs 74, and a ring-shaped seat 76 is carried on the inside surface of wall 72 on a shoulder 78 formed by the base 70.

Below the seat 76 as depicted in FIG. 2, the base 70 is formed with an inwardly tapering cavity 80 connected to a discharge outlet 82. The lowermost portion of base 70 is formed with a bottom wall 84 and a downwardly facing flange 86 which are separated by an annular recess or slot 88. A throughbore 90 extends through the center of the bottom wall 84 and the flange 86. The throughbore 90 receives a mounting post 92 which is held in place to the base 70 by a screw 94 extending upwardly into the mounting post 92 and having a head which engages the flange 86. The opposite end of mounting post 92 is connected to a filter disc 96 by a stub screw 98. As depicted in FIG. 2, the outermost circumferential edge of the filter disc 96 rests upon an inwardly tapered top edge of the internal seat 76 and is then fixed to the mounting post 92 by screw 98.

Referring now to FIGS. 2B–2E, a number of different filter discs 96 are illustrated which can be employed in the subject invention to obtain espresso and cappuccino of different taste, and to brew more than one cup of espresso and cappuccino at the same time. For example, the filter discs 96A and 96B schematically depicted in FIGS. 2B and 2C, respectively, are formed with apertures 100A and 100B of different diameter. The apertures 100A of filter disc 96A are preferably about 0.3 mm. in diameter whereas the apertures 100B of filter disc 96B are preferably about 0.4 mm. in diameter. The filter disc 96A would normally be used in southern Europe in countries such as Italy, whereas filter disc 96B would more commonly be used in northern European countries. A different taste is produced by filter discs 96A and 96B because the heated water passes the different diameter holes at different rates.

Figure 2D:
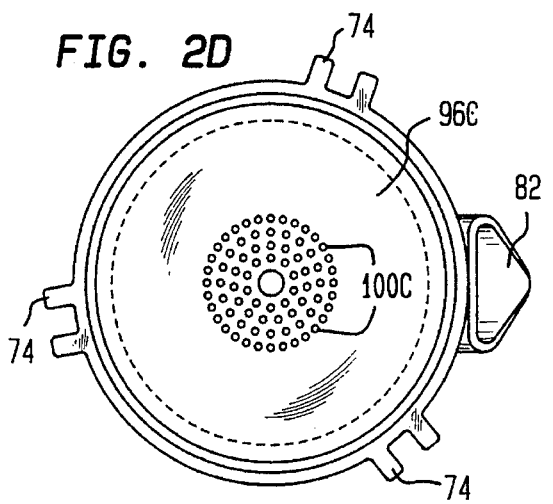
Figure 2E:
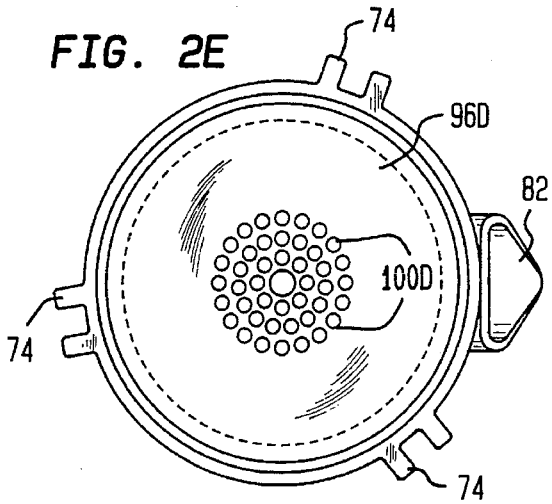

The filter discs 96C and 96D depicted in FIGS. 2D and 2E, respectively, have a larger number of apertures 100C and 100D which occupy a greater surface area of their respective filter discs 96C, D, than the discs 96A and B. Preferably, the size of the apertures 100A and 100C are the same, whereas the size of the apertures 100B and 100D are the same. Filter discs 96C and D are utilized to make two cups of espresso simultaneously, whereas filter discs 96A and B and intended to make a single cup of coffee or espresso. Because of the similarity in aperture size, the taste of the espresso produced by filter discs 96A and 96C is the same, while the espresso produced by filter discs 96B and 96D tastes the same.

It should be understood that the filter discs 96A–D described above can be replaced with other filter discs having different aperture sizes and/or different numbers of apertures. The concept is to provide a number of individual filter units capable of producing a different tasting espresso or cappuccino, and/or more than one cup of espresso or cappuccino at the same time, depending upon the requirements of a particular geographic area or customer. This adds significantly to the versatility of the apparatus 10 herein and makes it truly automated compared to other devices.

Filter Indexing Device

Figure 3:
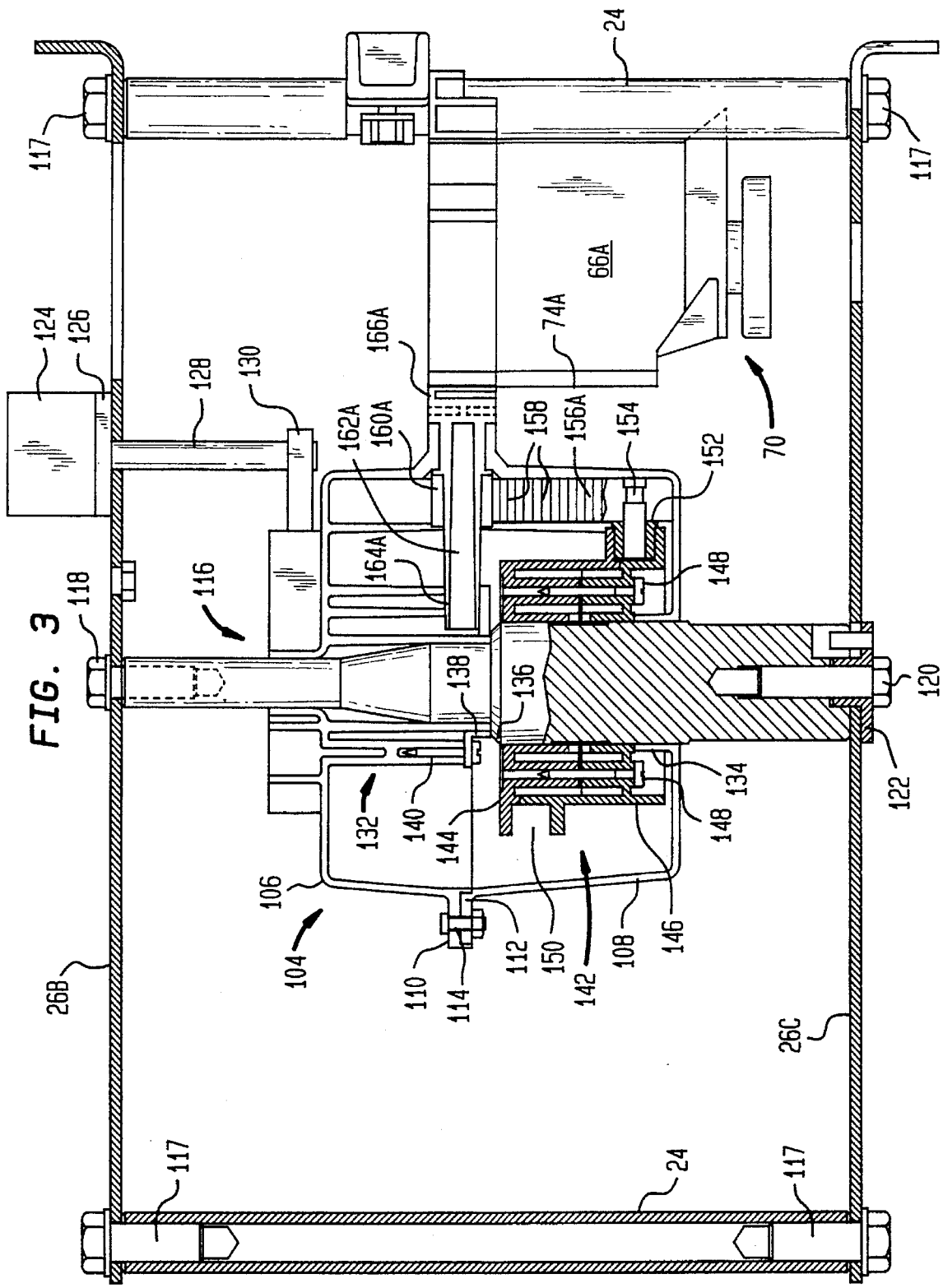
FIG. 3 is a cross sectional view of the filter indexing mechanism of this invention.
Figure 4:
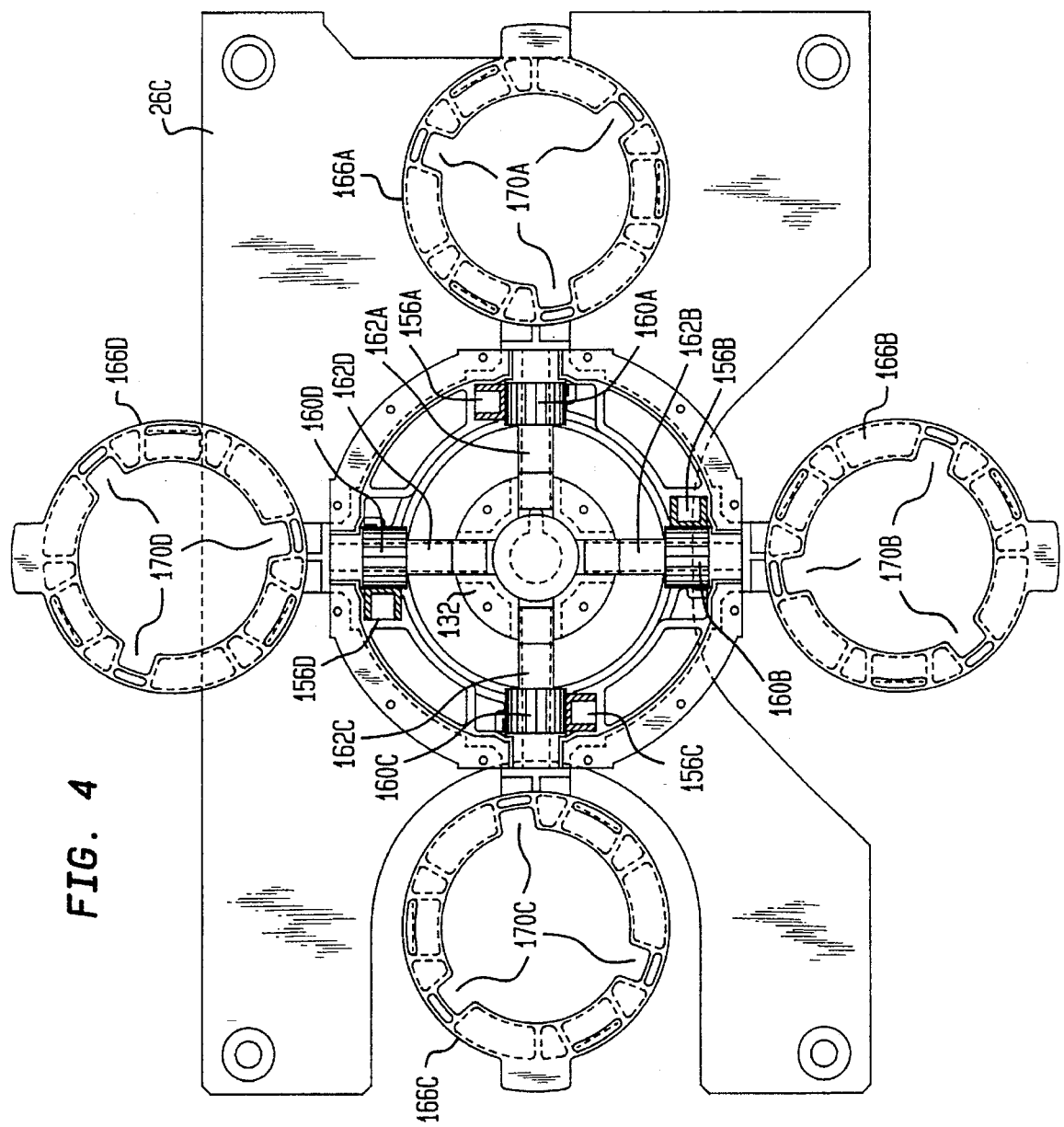
FIG. 4 is a partially broken away, plan view of the filter indexing mechanism of FIG. 3.

With reference to FIGS. 3 and 4, the filter indexing device 36 is illustrated in detail. As noted above, the purpose of the filter indexing device 36 is to selectively move each of the filter units 34A–D to the various stations 28, 30 and 32 in response to commands from the controller 52. Depending on the particular selection made by the operator, one of the filter units 34A–D is closed and then indexed, in sequence, to the coffee filling station 28, the coffee dispensing station 30 and then the filter cleaning station 32.

In the presently preferred embodiment, the filter indexing device 36 comprises a housing 104 having a top portion 106 and a bottom portion 108 formed with circumferentially extending flanges 110, 112 respectively, which are interconnected by screws or bolts 114. The housing 104 of filter indexing device 36 is rotatably carried by a central shaft 116 which extends between a top plate 26B and an intermediate plate 26C connected to adjacent columns 24 of cabinet 12 by screws 117. The top portion of central shaft 116 is secured to the plate 26B by a screw 118, and the bottom of central shaft 116 is secured to the intermediate plate 26C by a mounting bolt 120 insertable through a bushing 122.

The housing 104 of filter indexing device 36 is rotatable with respect to the central shaft 116 by operation of a motor 124 carried by the plate 26B. As schematically depicted in FIG. 3, the output of the motor 124 drives a notched, round plate 126 which, in turn, is connected by a shaft 128 to a crank arm 130 mounted to the housing 104. In order to permit rotation of the housing 104 with respect to the central shaft 116, an internal sleeve 132 is formed in the top portion 106 of housing 104, and a radially inwardly extending flange 134 is formed at the base of the bottom portion 108 of housing 104. The internal sleeve 132 and flange 134 slidably engage the central shaft 116 to permit relative rotation between the housing 104 and central shaft 116. As shown at the center of FIG. 3, the central shaft 116 is stepped thus forming a shoulder 136 upon which the base of internal sleeve 132 rests. A collar 138 is mounted to internal sleeve 132 at a location where the housing 104 rests upon the shoulder 136, and the collar 138 is secured in place by screws 140.

With reference to the bottom portion 108 of housing 104, structure is provided to invert the position of the filter holder 66A–D of filter units 34A–D depending upon their location relative to the different stations 28, 30 and 32. This structure includes a cam assembly 142 having an upper section 144 and a lower section 146 interconnected by screws 148. The cam assembly 142 is formed with a cam track 150 which receives four cams 152 each connected by a pin 154 to one of four rack arms 156A–D. As best shown in FIG. 4, a separate rack arm 156A–D is provided for each of the filter units 34A–D, respectively, to control the orientation of their filter holders 66A–D in a manner described below.

With reference now to the right hand portion of FIG. 3 and FIG. 4, the rack arm 156A is formed with teeth 158 which intermesh with the teeth of a pinion gear 160A carried at the inwardly extending end of a filter mounting arm 162A which forms part of the filter unit 34A. The innermost end of mounting arm 162A extends into a bore 164A formed in internal sleeve 132 to permit rotation of the filter unit 34A with the filter housing 104. The outwardly extending end of mounting arm 162A supports a ring 166A having a wall 168A formed with three slots 170A which slidably engage the ribs 74A formed along the outer surface of the wall 72A of filter holder 66A. See FIG. 4. The filter holder 66A is slid downwardly into engagement with the ring 166A, with its ribs 74A aligning with the slots 170A in ring 166A, and is supported in an upright position such that the open top 68 of filter holder 66A faces upwardly. Each of the other filter units 34B–D are provided with filter mounting arms 162B–D and associated structure which are identical to those associated with filter unit 34A. Structure which is common to the filter units 34A–D is therefore identified by the same reference numbers with the addition of the letters B, C or D.

As described in more detail below in connection with a discussion of the operation of apparatus 10, the filter indexing device 36 operates as follows. In response to the receipt of a signal from controller 52, motor 124 is operated to rotate the housing 104 through the connection between the output of motor 124 and the notched plate 126, shaft 128 and crank arm 130 as discussed above. Because the cam assembly 142 is fixed to the stationary central shaft 116, the cam 152 associated with each rack arm 156A–D moves along the cam track 150 of the cam assembly 142. In turn, the filter mounting arm 162A–D associated with each rack arm 156A–D, rotates with the housing 104 relative to the fixed central shaft 116. With the cam 152 in the position depicted on the right-hand side of FIG. 3, the rack arm 156A is in a lowermost position and the uppermost teeth 158 thereof engage the pinion gear 160 of filter mounting arm 162A. This places the filter holder 66A of the associated filter unit 34A in an upright position, i.e. such that it's open top 68 faces vertically upwardly as depicted in the Figs. As discussed below, such orientation of filter holder 66A is required at both the coffee filling station 28 and the coffee dispensing station 30.

Rotation of the housing 104 to a position such that the cam 152 of rack arm 156A is at the top of cam track 150 of cam assembly 142, e.g. in the position shown on the left-hand side of FIG. 3, causes the rack arm 156 to move vertically upwardly. Such upward movement of rack arm 156A rotates the pinion gear 160 of filter mounting arm 162A such that the filter holder 66A is inverted from the upright position. That is, the filter holder 66A is rotated approximately 180 degrees so that its open top 68 faces vertically downwardly toward the base 14 of apparatus 10. In this position, the filter holder 66A is ready for a cleaning operation at the filter cleaning station 32 described in detail below. The filter indexing device 36 is, therefore, effective to index each of the filter units 34A–D between the various stations 28, 30 and 32, and to move each filter holder 66A–D between an upright and inverted position depending upon which station it has moved to.

Coffee Dispensing Station

Referring now to FIGS. 5 through 10, the construction and operation of the coffee dispensing station 30 is illustrated in more detail. The principal elements of the coffee dispensing station 30 are the emulsifier 38, a water nozzle 174, structure for releasably interconnecting the filter holder 66A–D of each filter unit 34A–D with water nozzle 174, and, the discharge spout 46. The operation of coffee dispensing station 30 is governed by the controller 52 which, in turn, operates the hydraulic system depicted in FIG. 10. The structure and operation of the water nozzle 174 is discussed first, followed by an explanation of the structure for releasably interconnecting of the filter holder 66A–D with the water nozzle 174.

Figure 10:
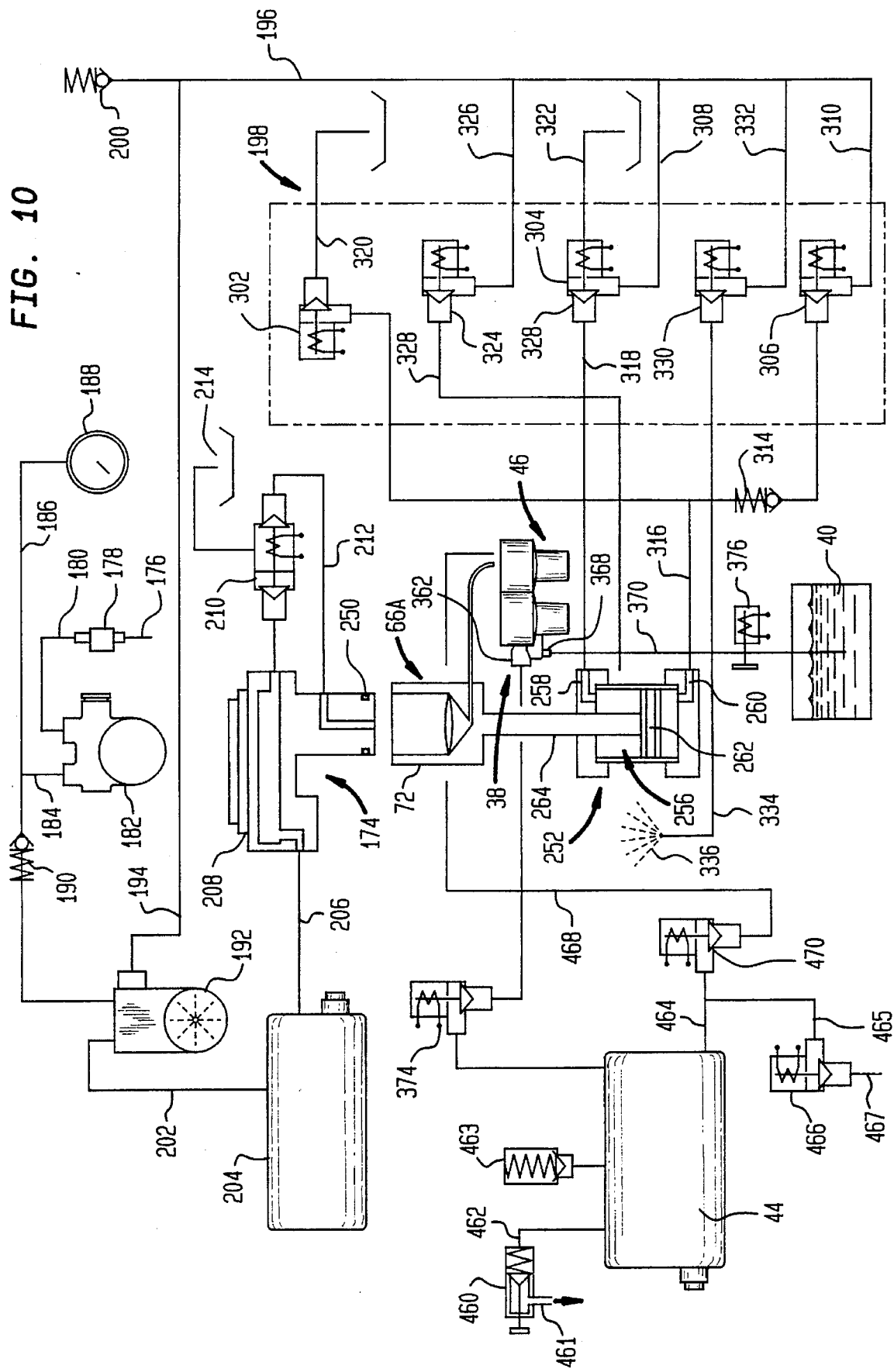
FIG. 10 is a schematic view of the hydraulic water and steam system of the subject machine.

With reference first to FIG. 10, an inlet line 176 carries water from a supply to an input filter 178. The input filter 178 is connected by a line 180 to a pump 182 having an outlet 184 connected to a transfer line 186. One end of transfer line 186 is connected to a pressure meter 188, and the other end of transfer line 186 is connected through a one-way valve 190 to a flow meter 192. The flow meter 192 is equipped with a bypass 194 which is connected to a feed line 196 for supplying water to a manifold 198 described in more detail below. Preferably, a one-way pressure relief valve 200 is carried in feed line 196 between the flow meter 192 and the manifold 198. A flow of water passes through the flow meter 192 and exits through a line 202 into a preheater 204 which functions to initially raise the temperature of the water to a predetermined level. The preheater 204 is advantageous in applications where a large quantity of coffee is desired in a relatively short period of time. The preheated water from preheater 204 is directed through a connector line 206 to the top of water nozzle 174 where a heater unit 208, depicted schematically in FIG. 10, heats the temperature of the water to the desired level for brewing coffee. Preferably, the heater unit 208 is of the type disclosed in International Patent Application No. PCT/EP90/07153, filed Oct. 17, 1990 by Nuova Faema to Giuliano, the disclosure of which is incorporated by reference in its entirety herein. The heater unit of Application No. PCT/EP90/01753 is operative, in cooperation with controller 52, to instantaneously heat the water entering nozzle 174 to the proper brewing temperature so that the brewing operation can proceed more quickly while obtaining espresso of superior quality. The heated water is emitted from the top portion of water nozzle 174 through a solonoid valve 210 operated by controller 52. The heated water passes through the solonoid valve 210 and is emitted into a line 212 connected to the lower portion of water nozzle 174 as best shown in FIG. 8. Preferably, the solonoid valve 210 is connected to a dump line 214 to dispose of any excess water from solonoid valve 210.

With reference to FIG. 8, the water nozzle 174 is illustrated in more detail. The water nozzle 174 comprises a lower housing 216 connected to an upper portion or housing 218 by an elongated mounting bolt 220. The upper housing 218, in turn, is connected by bolt 219 to the cabinet structure of apparatus 10 in a manner now shown. Preferably, the top of upper housing 218 is formed with a bore which receives a sleeve 221 formed at the top of lower housing 216. In order to provide a seal between the housings 216, 218, the lower housing 216 mounts an o-ring 222 within a recess 224 formed therein 216. The upper housing 218 is formed with a bore 226, connected by line 212 to solenoid valve 210, which delivers heated water to an annular cavity 228 formed at the top of lower housing 216. This cavity 228 is connected to one end of a water delivery line 230 formed in lower housing 216 which terminates at the base thereof.

In the presently preferred embodiment, the lower housing 216 is formed with an annular flange 234 at its lowermost end which receives a discharge plate 236 connected to the elongated mounting bolt 220. As depicted in FIG. 8, the discharge plate 236 has an upper surface formed with an annular supply cavity 240 which is partially closed by a cover plate 242 except for an opening through which the supply cavity 240 is connected to the water delivery line 230 within lower housing 216. The discharge plate 236 is formed with a number of bores 244 which extend therethrough and intersect the supply cavity 240. The discharge end of these throughbores 244 face a perforated disc 246 mounted at the base of discharge plate 236. A water delivery path is therefore provided from the bore 226 in upper housing 218, through the cavity 228 and water delivery line 230 formed in lower housing 216 to the discharge plate 236. The heated water enters the supply cavity 240 in discharge plate 236 where it is distributed to the throughbores 244 and then discharged in a "shower"-type spray from the perforated disc 246.

As shown at the bottom of FIG. 8, the lower housing 216 of water nozzle 174 is formed with an outwardly facing recess 248 which mounts an o-ring 250. The o-ring 250 is dimensioned to sealingly engage the interior of the wall 72 of each filter holder 66A–D in order to permit the discharge of heated water, under pressure, from the perforated disc 246 of water nozzle 174 into the filter holder 66A–D as described below.

With reference to FIGS. 5, 6 and 10, structure is illustrated for placing each of the filter holders 66A–D of filter units 34A–D into sealing engagement with the water nozzle 174. This structure comprises a hydraulic cylinder 252 having a housing 254 within which a piston 256 is axially movable. As described more fully below in connection with a discussion of the valving system for actuating cylinder 252, the cylinder housing 254 is formed with a port 258 at the top of housing 254 and a second port 260 at the base, such that the ports 258, 260 are located on either side of the head 262 of piston 256. See also FIG. 10.

The rod 264 of piston 256 extends outwardly from the cylinder housing 254 and is mounted by a screw 266 to a bracket 268. As best shown in FIG. 6, the bracket 268 is roughly U-shaped having opposed inwardly extending, horizontal arms 269A and B. The base of bracket 268, in turn, is fixed by screws or rivets 270 to the horizontal leg 271 of a switch plate 272 having a vertical leg 273 which extends alongside the cylinder 252. The vertical leg 273 of switch plate 272 is formed with a slot 274 and a bottom edge 276. The switch plate 272 is movable with respect to an upper travel micro switch 278 and a lower travel micro switch 280, both of which are carried by a switch mounting plate 282 connected by screws 284 to a support 286 which also mounts cylinder 252. As shown in FIG. 5, the upper micro switch 278 has a trip bar 288 carrying a roller 290 which is movable with respect to an on/off button 292. The lower micro switch 280 has a trip bar 294 movable with respect to an on/off button 296. Both of the micro switches 278, 280 are connected to the controller 52 as schematically depicted in FIG. 5. The purpose of micro switches 278, 280 is discussed below in connection with a description of the operation of cylinder 252.

With reference to FIG. 10, the portion of the hydraulic system of this invention which controls the operation of cylinder 252 is contained within the manifold 198. In the presently preferred embodiment, the manifold 198 includes a piston down solenoid valve 302, a two-way solenoid valve 304 and a piston up solenoid valve 306. The two-way solenoid valve 304 is connected by a branch line 308 to the water feed line 196, and a branch line 310 interconnects the feed line 196 with the piston up solenoid valve 306. The piston up solenoid valve 306 and piston down solenoid valve 302 are interconnected by a transfer line 312 which carries a one-way valve 314. A first connector line 316 extends between the transfer line 312 and the port 260 at the base of cylinder 252, and a second connector line 318 extends between the top port 258 of cylinder 252 and the two-way solenoid valve 304. Preferably, both the piston down solenoid valve 302 and two-way solenoid valve 304 have dump lines 320, 322, respectively.

As schematically depicted in FIG. 10, the manifold 198 also includes a boiler fill solenoid valve 324 which is connected by a branch line 326 to the feed line 196, and by a transfer line 328 to the boiler 44 mentioned above. Additionally, the manifold 198 includes still another solenoid valve 330 which is connected by a branch line 332 to the water feed line 196. Solenoid valve 330, in turn, is connected by a line 334 to a sprayhead 336, the purpose of which is described below in connection with a discussion of the filter washing station 33.

The operation of the water delivery portion of the coffee dispensing station 30 is as follows. After having received a quantity of coffee from the coffee filling station 28, filter holder 66A of filter unit 34A is moved by the filter indexing device 36 to the coffee dispensing station 30 in the manner described above. It should be understood that the various filter holders 66A–D are selectively moved to the coffee dispensing station 30 depending on the particular selection of espresso or cappuccino made by the operator, and only the coffee brewing operation for filter holder 66A is discussed in detail herein.

In the course of movement of filter holder 66A to the coffee dispensing station 30, the inwardly extending, horizontally oriented arms 269A and 269B of bracket 268 extend within the slot 88 formed in the base of filter holder 66A. In this position, the arms 269A,B are captured between the bottom wall 84 and flange 86 of filter holder 66A so that the filter holder 66A is movable with the bracket 268. In response to a signal from the controller 52, the piston up solenoid valve 306 is opened to permit the flow of water there through into transfer line 312. This flow of water unseats the one-way valve 314, allowing the water to pass through connector line 316 into the bottom port 260 of cylinder 252. Accordingly, the cylinder housing 254 beneath the piston head 262 is pressurized thus forcing the piston 256 to move vertically upwardly with respect to the cylinder housing 254. Because the bracket 268 is mounted to piston rod 264, the bracket 268, filter holder 66A and switch plate 272 all move vertically upwardly with the piston rod 264. The stroke or vertical extent of movement of the piston rod 264 is selected so that the filter holder 66A moves upwardly into engagement with the lower housing 216 of water nozzle 174. A seal is created between the wall 72 of filter holder 66A and the o-ring 250 carried in the recess 248 of lower housing 216. Preferably, in the course of moving upwardly into engagement with the water nozzle 174, the ground coffee resting on the filter disc 96 within filter holder 66A is compacted by engagement with the perforated disc 246 at the base of water nozzle 174 in preparation for the brewing operation.

Before the brewing operation can proceed, the controller 52 must receive a signal from the upper micro switch 278 carried by the switch plate 272 indicating that the filter holder 66A has indeed moved into position relative to the water nozzle 174. As depicted in FIG. 5, the roller 290 of upper micro switch 278 extends into the slot 274 formed in the switch plate 272. When the roller 290 is positioned within the slot 274, the trip bar 288 connected thereto disengages the on/off button 292 of upper micro switch 278. Upon movement of the switch plate 272 vertically upwardly, such that the slot 274 therein moves past the roller 290, the switch plate 272 forces the roller 290, and, in turn, the trip bar 288, inwardly or to the right as depicted in FIG. 5. This forces the trip bar 288 into engagement with the on/off button 292 of micro switch 278 sending a signal to the controller 52. Such signal provides an indication that the filter holder 66A has moved vertically upwardly into engagement with the water nozzle 174 in preparation for a brewing operation. Accordingly, the upper micro switch 278 functions as a safety measure to ensure that the filter holder 66A is in the proper position relative to water nozzle 174 before the brewing operation takes place.

Having received a signal from upper micro switch 278, the controller 52 is then operative to open solenoid valve 210 and permit the flow of heated water through line 212 into the water nozzle 174 as described above. The heated water, under pressure, is sprayed or showered from the perforated disc 246 of water nozzle 174 into the ground coffee held by the filter disc 96 within filter holder 66A thus forming brewed coffee which is then discharged through the discharge outlet 82 at the base of filter holder 66A. The brewed coffee is directed into the discharge spout 46 at the coffee dispensing station 30, the structure of which is described below.

With reference again to FIG. 10, it is noted that as the piston head 262 moves vertically upwardly, the water within cylinder housing 252 above the piston head 262 is dumped through connector line 318 to the two-way solenoid valve 304. The controller 52 is operative to move the two-way solenoid valve 304 into a position to dump the water therethrough into the dump line 320 associated with two-way valve 304. Once the brewing operation is completed, the piston rod 264 is moved in the opposite direction by operation of two-way solenoid valve 304 and the piston down solonoid valve 302. The controller 52 generates signals causing the two-way solonoid valve 304 to move to a reverse position, compared to that described above, which permits the flow of water from supply line 196, through branch line 308 into the two-way solonoid valve 304. In the shifted or reverse position, the two-way solonoid valve 304 permits the flow of water through connector line 318 and into the top port 258 of cylinder housing 254. This pressurizes that portion of the cylinder housing 254 above the piston head 262 forcing it vertically downwardly. In turn, the bracket 268, switch plate 272 and filter holder 66A are also moved vertically downwardly. In order to dump the water contained in the cylinder housing 254 below the piston head 262, the controller 52 generates a signal to open the piston down solonoid valve 302 thus permitting a flow of water from the bottom port 260, through connector line 316 and transfer line 312 into the piston down solonoid valve 302. Flow of water into the piston up solenoid valve 306 is blocked by the one-way valve 314 within transfer line 312. In the open position, the piston down solenoid valve 302 discharges the water through its dump line 322.

Before the filter holder 66A can be moved to the filter cleaning station 32 described below, the controller 52 must receive a signal from the lower micro switch 280 indicating that, in fact, the piston rod 264 is in a fully retracted position and, therefore, that the filter holder 66A has disengaged from the water nozzle 174. This signal is provided by contact between the bottom edge 276 of switch plate 272 and the trip bar 294 associated with lower micro switch 280. When the switch plate 272 has reached the lowermost position, its bottom edge 276 causes the trip bar 294 to activate on/off button 296 which causes the lower micro switch 280 to transmit a signal to the controller 52. Having received this signal, the controller 52 then activates the filter indexing device 36 to transmit the filter holder 66A from the coffee dispensing station 30 to the filter cleaning station 32 for a cleaning operation described below.

Referring now to FIGS. 7–10, additional structure associated with the coffee dispensing station 30 is illustrated. As described above, the apparatus 10 of this invention is operative to produce espresso or cappuccino, as desired. The foregoing discussion of the coffee dispensing station 30 involved a description of the structure for producing espresso from each of the filter units 34A–D. The following description involves a discussion of the production of foamed milk for combination with the espresso to form cappuccino.

Figure 9:
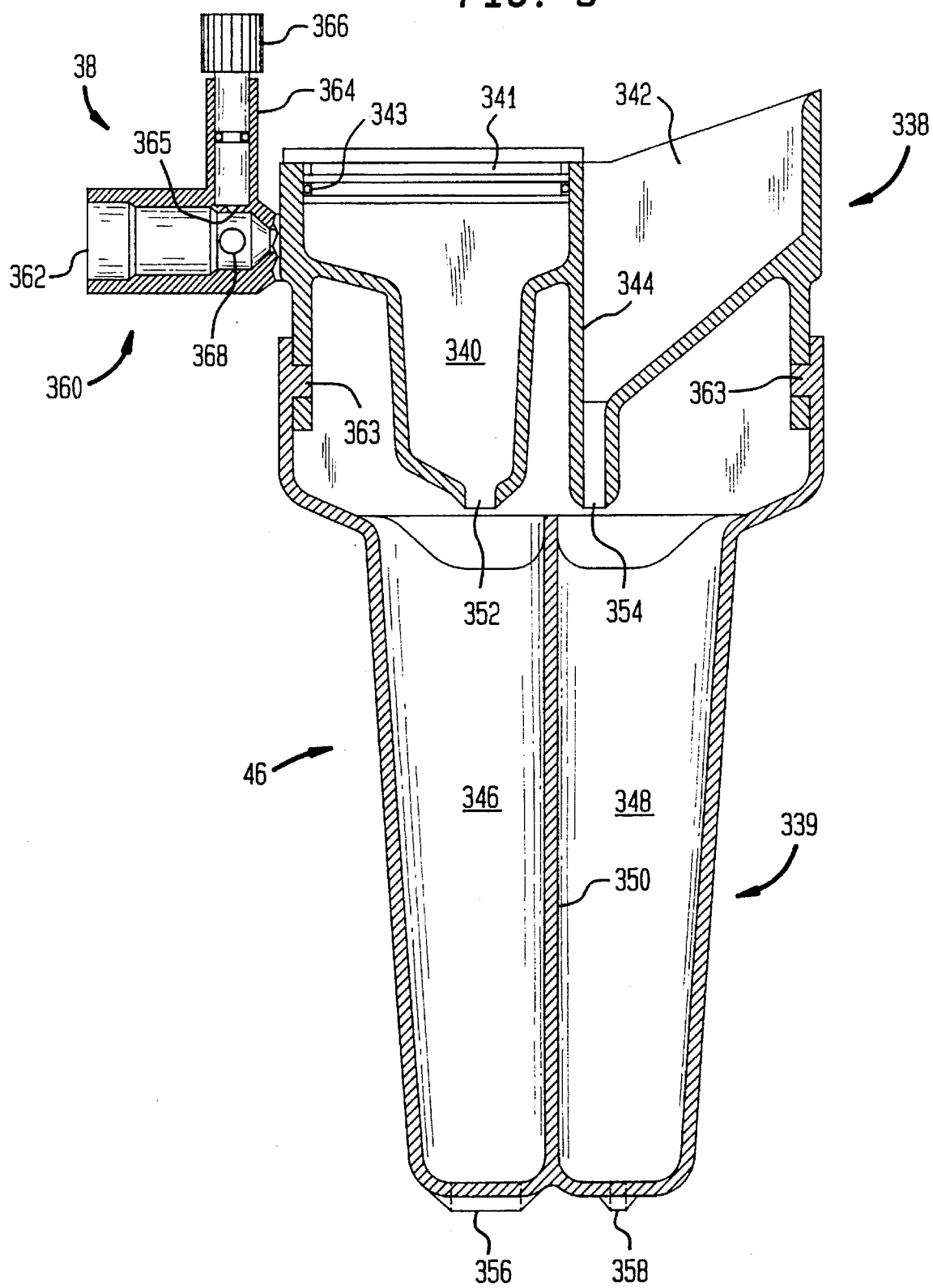
FIG. 9 is a cross sectional view of the emulsifier and discharge spout located at the coffee dispensing station.

With reference initially to FIGS. 9–10, the discharge spout 46 generally comprises a housing having an upper portion 338 formed with an emulsifier chamber 340 associated with emulsifier 38, and an espresso cavity 342 located beside the emulsifier chamber 340 with a common wall 344 therebetween. The emulsifier chamber 340 is closed by a cap 341 carrying an o-ring 343 to form a seal therebetween. The housing of discharge spout 46 also includes a lower portion 339 formed with an emulsified milk discharge passage 346 and an espresso discharge passage 348 which share a common wall 350. These passages 346, 348 communicate with the emulsifier chamber 340 and espresso cavity 342 via connector ports 352 and 354, respectively. The opposite end of discharge passageway 346 is formed with a discharge outlet 356, and the espresso passage 348 terminates with a separate discharge outlet 358.

Each of the discharge passages 346 and 348, in turn, is separated into two halves by a wall 351 extending substantially perpendicularly to the common wall 350. Both half portions of the emulsified milk passageway 346 communicate with the emulsifier chamber 340 through an aligning connector ports 352 formed therein, and terminate at their opposite end with separate discharge outlets 356. Similarly, the two half portions of the espresso discharge passage 348 communicate with the espresso chamber 340 through an aligning connector ports 354, and terminate at their opposite end with separate discharge outlets 348.

The configuration of the discharge spout 46 is intended to permit the filling of one container of espresso or cappuccino, or two containers simultaneously, depending upon the placement of the container relative to the discharge outlets 356 and 358. As shown in FIGS. 9A and 9B, the discharge outlets 358 associated with espresso discharge passage 342 are spaced apart such that espresso emitted therefrom can be directed into two tall glasses 359 or two coffee cups 361. The discharge outlets 356 for the foamed milk align with the espresso outlets 358. If only a single cup of espresso or cappuccino is required, then a single glass 359 or cup 361 is centered on the discharge outlets 356, 358 so that they all empty into the single container. Preferably, as depicted in FIGS. 9A and 9B, the upper and lower portions 338, 339 of discharge spout 46 are pivotally connected by pins 363. This pivotal connection allows the discharge spout 46 to be pivoted between a retracted position (FIG. 9A) to accommodate the tall cups or glasses 359, and an extended position (FIG. 9B) for dispensing into normal sized coffee cups 361.

The detailed structure and operation of emulsifier 38 forms no part of this invention as such. It is contemplated that emulsifiers of the type disclosed in U.S. Pat. Nos. 4,715,274 to Paoletti and 4,779,519 to Giuliano would be suitable for use herein, and the disclosures of such patents are hereby incorporated by reference in their entireties. Alternatively, other devices capable of providing suitable foamed milk could be utilized herein. For purposes of the present discussion, the emulsifier 38 generally comprises a housing 360 formed with a steam inlet 362 and an air inlet tube 364 terminating with an air port 365. An adjustment pin 366 is movable within the inlet tube 364 to vary the amount of air which can enter the housing 360 through air port 365. The housing 360 is also formed with a milk inlet 368, depicted schematically in FIGS. 9 and 10, which mounts one end of a milk line 370 whose other end connects to the milk container 40. See also FIG. 1. As shown in FIGS. 7 and 10, the steam inlet 362 of emulsifier 38 is fitted onto a nozzle 369 having o-rings 370, which, in turn, is located at one end of a tube 371 connected to a steam line 372 from-boiler 44. Preferably, the steam line 372 is mounted to tube 371 with a bushing 373. As depicted in FIG. 10, a solenoid valve 374 is located in the steam line 372, and a pinch valve 376 is carried in the milk line 370. The operation of these valves 374, 376 is controlled by the controller 52 in the manner described below.

In order to make cappuccino, the controller 52 operates the water delivery structure of coffee dispensing station 30 described above to obtain espresso which is directed into the discharge spout 46. The passage of espresso from the discharge outlet 82A of filter holder 66A into the espresso cavity 342 of discharge spout 46 is aided by a pivotal channel 378 depicted in FIGS. 6 and 7. This pivotal channel 378 is pivotally connected to the arm 269B of bracket 268, and is pinned near its opposite end to a pair of pivot arms 379, only one of which shown in the Figs. As the filter holder 66A is moved vertically upwardly in preparation for a brewing operation as described above, the bracket 268 carries with it the channel 378 which is pivoted about the connection with bracket 268 by the pivot arm 379 so that the channel 378 moves from a generally horizontal position to a downwardly angled position with respect to the discharge spout 46. See also FIG. 1. With the filter holder 66A in a fully seated position relative to the water nozzle 174, the discharge outlet 82 of filter holder 66A aligns with the pivotal channel 378 whose discharge end 382 overlies the espresso cavity 342 in discharge spout 46. The flow of espresso from the filter holder 66A is thus directed along the channel 378 into the espresso cavity 342 of spout 46 for delivery into an awaiting cup on the base 14 of cabinet 12.

Either simultaneously with the above-described operation, or subsequent to the brewing of the espresso, the controller 52 is operative to open the solenoid valve 374 within the steam line 372 allowing a flow of steam from boiler 44 into the housing 360 of emulsifier 38. In a manner described in detail in U.S. Pat. Nos. 4,715,274 and 4,779, 519, the flow of steam through housing 360 creates a vacuum within the emulsifier housing 360 which draws air and milk therein through their respective inlets 364 and 368. The air and milk are intermixed in the emulsifier chamber 340 of emulsifier 38 to produce foamed milk which is directed through the connector port 352 of emulsifier chamber 340 and into the discharge passage 346 of discharge spout 46. The foamed milk exits the discharge outlet 356 of passage 346 and flows into the cup with the espresso.

When one or two cups of cappuccino have been made, a cleaning cycle is preferably initiated to remove the milk still present within the emulsifier 38, and within that portion of the milk line 370 between the pinch valve 376 and emulsifier 38. Initially, the controller 52 operates to close both the solenoid valve 374 in steam line 372 and the pinch valve 376 in milk line 370. A period of time is allowed to elapse in order to permit milk remaining in the emulsifying chamber 340 of emulsifier 38 to drip downwardly by gravity toward the passage 346 of discharge spout 46. After a short period of time, the controller 52 opens the steam solenoid valve 374 permitting a short burst of steam to pass through the emulsifier housing 360, into the emulsifier chamber 340 and then into the discharge spout 46. This flow of steam creates at least a partial suction within the emulsifier 38 thus drawing substantially all of the milk remaining within the emulsifier 38 into the emulsifier housing 360 for passage to the discharge spout 46. After this cleaning operation has been performed, the pinch valve 376 in milk line 3670 is opened, and remains open, in preparation for another operation to make foamed milk.

Filter Cleaning and Washing Station

Figure 11:
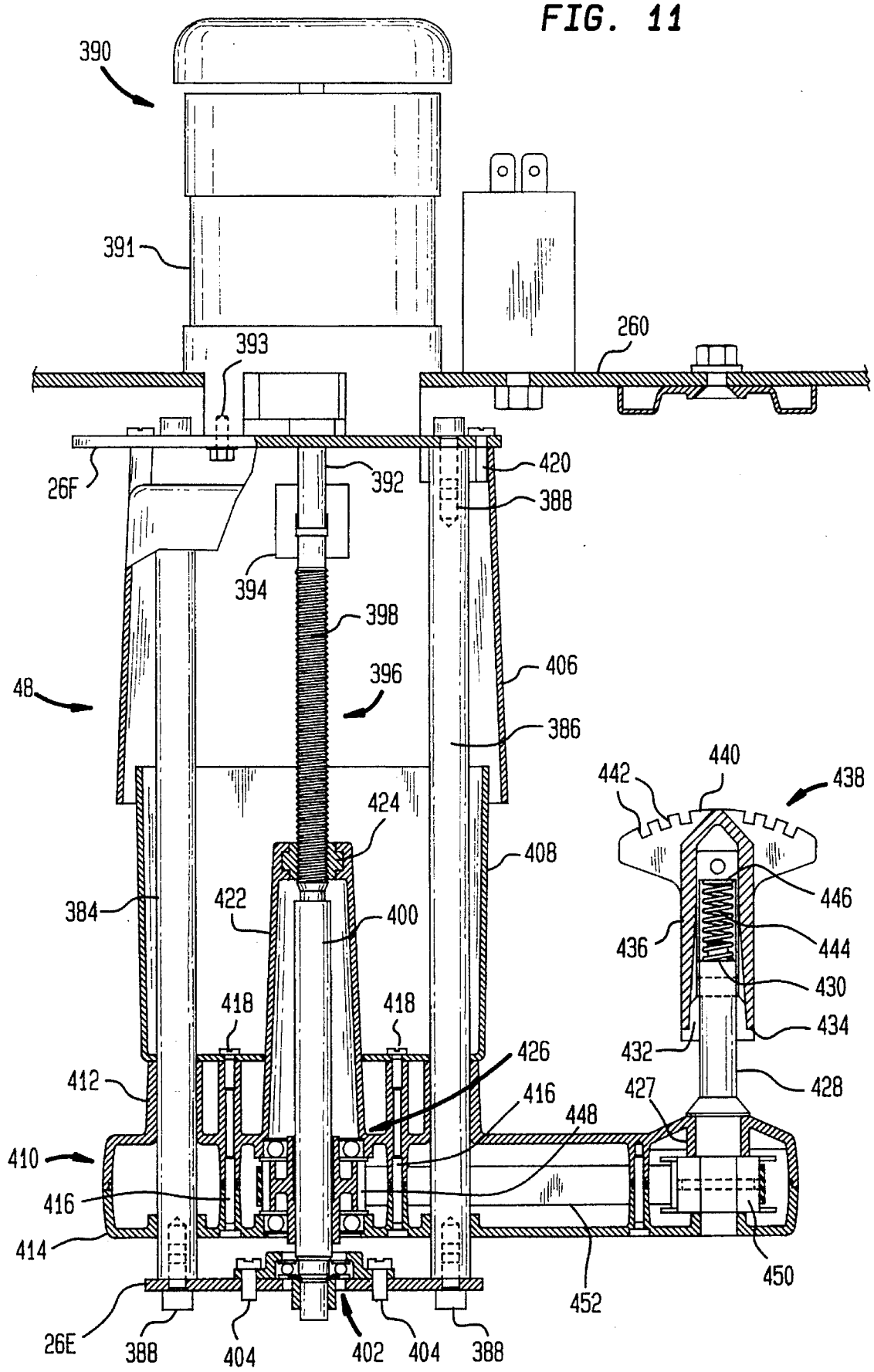
FIG. 11 is a cross sectional view of the filter cleaning mechanism.

Referring now to FIGS. 1 and 11, the cleaning device 48 located at the filter cleaning station 32 is illustrated in detail. After having completed a brewing operation at the coffee dispensing station 30 described above, a "cake" of compacted coffee grounds is located atop the filter disc 96 of filter holder 66A. These coffee grounds must be removed and deposited into the waste container 50 before another coffee filling and brewing operation can be performed with filter holder 66A. The purpose of the cleaning device 48 at the filter cleaning station 32 is to remove the majority of these coffee grounds from filter holder 66A, and the other filter holder 66B–D, and then any remaining grounds are removed by a water spray at the filter washing station 33.

As depicted in FIG. 11, the cleaning device 48 is located between support plates 26D and E which are separated by vertical posts 384 and 386 connected thereto by screws 388. A reversible motor 390 is carried by a third support plate 26F connected to the cabinet 12 of apparatus 10 in a manner not shown. The housing 391 of motor 390 is connected by screws 393 to plate 26D, and the motor 390 has an output shaft 392 which is drivingly connected through a coupler 394 to a central shaft 396. The central shaft 396 has a threaded upper portion 398 and a lower portion 400 whose terminal end is received within a bearing 402 mounted by screws 404 to the plate 26E.

The central shaft 396 is contained within an upper housing 406, a lower housing 408, and a base 410 having a top half 412 and a bottom end 414 interconnected by screws 416. The top half 412 of base 410 is connected by screws 418 to the base of lower housing 408, and the upper housing 406 is fixed to the support plate 26D by screws 420. As depicted in FIG. 11, the lower housing 408 is smaller in cross section than the upper housing 406 so that the lower housing 408 can telescope within the upper housing 406 in the manner described below.

In the presently preferred embodiment, the lower housing 408 is formed with a sleeve 422 which mounts a nut 424 threaded onto the threaded upper portion 398 of central shaft 396. The top and bottom halves 412, 414 of the base 410 mount a bearing 426 which permits rotation of the central shaft 396 with respect to the base 410. In response to operation of the motor 390, the central shaft 396 rotates within the bearing 402 carried by mounting plate 26E and within the bearing 426 carried by the base 410. Because the base 410 is held in a rotatably fixed position with respect to central shaft 396, rotation of the central shaft 396 causes the nut 424 mounted to the sleeve 422 of base 410 to travel axially along the threaded upper portion 398 as the central shaft 396 is rotated. In turn, the base 410 and lower housing 408 are moved upwardly and downwardly with respect to the upper housing 406 depending upon the direction of rotation of central shaft 396. As noted above, the relative sizes of the upper and lower housings, 406, 408 allows the smaller, lower housing 408 to telescope within the larger upper housing 406.

Referring now to the bottom portion of FIG. 11, the base 410 extends outwardly from the central shaft 396 and is formed with a sleeve 427 which rotatably mounts the bottom portion of a cleaning blade shaft 428. The shaft 428 extends upwardly from the base 410 and is formed with a shoulder 430 at its uppermost end. A collar 432 formed with a seat 434 is mounted to the exterior surface of shaft 428 in position to receive the tubular body 436 of a cleaning blade 438 having a flared upper portion 440 formed with serrations 442. As depicted in FIG. 11, the base of tubular body 436 rests upon the seat 434, and a spring 444 extends between the shoulder 430 at the top of shaft 428 and an internal wall 446 within the tubular body 436 of cleaning blade 438.

In the presently preferred embodiment, the lower portion of central shaft 396 is fixed to a pulley 448 which aligns with a second pulley 450 fixed to the cleaning blade shaft 428. The pulleys 448 and 450 are drivingly interconnected by an endless belt 452 extending therebetween. In response to rotation of the central shaft 396, the pulleys 448, 450 and belt 452 rotate the cleaning blade shaft 428 which, in turn, rotates the cleaning blade 438.

A cleaning operation for filter holder 66A proceeds as follows. As discussed above, the filter indexing device 36 is operative to invert the filter holder 66A in the course of its movement from the coffee dispensing station 30 to the filter cleaning station 32. That is, the filter holder 66A is rotated approximately 180 degrees from a position at the coffee dispensing station 30 wherein the open top 68 of the filter holder 66A faces upwardly, to a position at the filter cleaning station 32 wherein the open top 68 of filter holder 66A faces downwardly. The filter indexing device 36 positions the filter holder 66A in direct alignment with the cleaning blade 438 but in a position vertically thereabove.

With the filter holder 66A in an inverted position at the filter cleaning station 32, the motor 390 associated with the cleaning device 48 is activated to rotate the central shaft 396 in a direction which causes the nut 424 to move vertically upwardly along the threaded upper portion 398 of central shaft 396. In turn, the lower housing 408 and base 410 are moved vertically upwardly, carrying with them the cleaning blade 438 which enters the interior of filter holder 66. Rotation of the central shaft 396 also causes the cleaning blade shaft 428 to rotate due to the interconnection between pulleys 448, 450 and belt 452. As a result, the flared upper portion 440 of the cleaning blade 438 with the serrations 442 is moved vertically upwardly into the interior of filter holder 66A, and rotated therein, to remove the compacted or caked coffee grounds from the filter disc 96. These coffee grounds fall by gravity into the waste container 50 located beneath the cleaning blade 438.

When the above-described cleaning operation has been completed, the controller 52 operates the motor 390 to reverse the direction of rotation of its outlet shaft 392. This reverses the direction of rotation of central shaft 396 causing the nut 424, lower housing 408 and base 410 to move downwardly with respect of the upper housing 406, thus removing the cleaning blade 438 from the interior of filter holder 66A.

In the presently preferred embodiment, the filter indexing device 36 is then operated by the controller 52 to move the filter holder 66A to the filter washing station 33 which is located opposite the coffee dispensing station 30. As schematically depicted in FIG. 1, the sprayhead 336, connected by lines 332 and 334 to water feed line 196, is located at the filter washing station 33 in a position to direct a shower of water into the interior of filter holder 66A to remove any coffee grounds which were not eliminated at the filter cleaning station 32. For this purpose, the filter indexing device 36 is operative to maintain filter holder 66A in an inverted position in the course of movement thereof between the filter cleaning and washing stations 32, 33. Preferably, the controller 52 opens the solenoid valve 330 to initiate a flow of water through sprayhead 336 while a coffee brewing/dispensing operation is taking place at the coffee dispensing station 30. Additionally, the controller 52 is operative to execute a washing cycle of all filter holders 34A–D in sequence at the initial start-up of apparatus 10 and/or where the apparatus 10 remains nonoperational for extended periods. The filter washing station 33 thus ensures that all filter holders 34A–D are clean at all times.

Operation of Apparatus

The apparatus 10 of this invention is very versatile in operation and is capable of producing one or two cups of espresso or cappuccino of different taste. The apparatus 10 is provided with a control pad 364, depicted schematically in FIG. 1, which activates a particular operational sequence within the software of controller 52 to obtain the desired beverage.

As described above, the filter holders 66A–D are provided with individual filter discs 96A–D, respectively, to obtain different types of espresso or cappuccino. Filter discs 96A and 96C have apertures 100A and 100C of the same diameter, but apertures 100A are formed in a smaller surface area along filter disc 96A compared to apertures 100C in filter disc 96C. That is, there are fewer apertures 100A in disc 96A compared to the apertures 100C in disc 96C. As a result, a single cup of espresso can be made with filter holder 66A and filter 96A, while filter holder 66C and filter disc 96C can be used to make two cups of coffee simultaneously. This same relationship is true with respect to filter discs 96B, D and apertures 100B, D, except that the size of apertures 100B and D are different from the size of apertures 100A and C. Accordingly, espresso or cappuccino of different taste, in either one or two cup quantities, can be readily obtained by the apparatus 10 of this invention by the touch of a button on control pad 454 associated with the controller 52.

In order to determine which of the filter holders 66A–D should be utilized when a particular beverage selection is made, one of the filter holders 66A–D, for example filter holder 66A, carries a magnet 456 movable past a sensor 458 which is located at the coffee filling station 28 and is connected by a lead (not shown) to the controller 52. When an operator makes the selection of particular beverage, the filter indexing device 36 is operated by the controller 52 to move the filter holders 66A–D past the coffee filling station 28 until the presence of the filter holder 66A with magnet 456 is sensed by the sensor 458. When this filter holder 66A is located, the controller 52 operates the filter indexing device 36 to index the appropriate filter holder 66A,B,C or D to the coffee filling station 28 depending upon a particular selection by the operator. The location of the other filter holders 66B,C and D is known because such information is programmed into the softwear of controller 52.

The selected filter holder 66A, B,C or D receives ground coffee at the coffee filling station 28 in the manner described above, and is then moved by the filter indexing device 36 to the coffee dispensing station 30 in preparation for the brewing operation. As described in detail above, the piston 256 of cylinder 252 causes the filter holder 66A, for example, to move vertically upwardly into sealing engagement with the water nozzle 174 and, at the same time, the ground coffee carried on the filter disc 96 of filter holder 66A is compacted against the filter disc 96. After receiving a signal from the upper micro switch 278 indicating that the filter holder 66A is in a brewing position, the controller 52 operates the water nozzle 174 to direct heated water under pressure through the filter holder 66A, out its discharge outlet 82 and then along the pivotal channel 378 into the espresso cavity 342 of the discharge spout 46. In the event the selection by the operator was for cappuccino, the emulsifier 38 is also operated by the controller 52 in the manner described above to introduce foamed milk into the discharge passage 346 of the discharge spout 46, either at the same time or subsequent to the passage of espresso therethrough. One or two cups are placed by the operator on the base 14 of cabinet 12, directly beneath the discharge spout 46, to receive the espresso or cappuccino without any operator intervention.

Having completed the brewing operation, the emulsifier 38, including its emulsifier chamber 340, is cleaned of milk in the cleaning operation described above. The filter holder 66A is then retracted from the water nozzle 174 and moved to a lowered position as sensed by the lower micro switch 280. After receiving a signal from switch 280, the controller 52 causes the filter indexing device 36 to move the filter holder 66A into position at the filter cleaning station 32 for the removal of the cake or body of ground coffee from the interior of the filter holder 66A in the manner described above.

While the invention has been described with reference to a preferred embodiment, it should be understood by those skilled in the art that various changes may be made and equivalence may be substituted for elements thereof without departing from the scope of the invention. In addition, many modifications may made to adapt a particular situation or material to the teachings of the invention without departing from the central scope thereof.

For example, four filter units 34A-D are illustrated in the Figs. each having different filter discs 96A-D associated therewith. It should be understood that a different number of filter units can be utilized with apparatus 10, having a variety of filter discs 96, and still be considered within the scope of this invention. The particular number and configuration of the filter units 34 and filter discs 96 are therefore considered to be illustrative of the concept herein, and not in any way limiting.

With reference to FIG. 10, a number of optional features are illustrated schematically which can be incorporated in the finished apparatus if desired. For example, the apparatus may include a steam valve 460 connected by a line 462 to the boiler 44 in order to obtain a separate source of steam for discharge through a steam tube 461. See FIG. 1. Preferably, the boiler 44 also includes a pressure relief valve 463, and is connected by a hot water line 464 and a a branch line 465 carrying a valve 466 to an external water discharge tube 467 in order to provide the option of a separate source of hot water. Further, heated water can be introduced through the water nozzle 178 via a line 468 connected to the hot water line 464 through a valve 470. This provides a supply of hot water through the discharge spout 46 rather than through the separate hot water discharge tube 467.

Additionally, it is contemplated that the controller 52 can be programmed to perform an initial system setup or check sequence before the apparatus 10 is utilized, and/or periodically during use of the apparatus 10 if it has not been activated for a period of time. Such a system check includes sensing of the temperatures within the preheater 204, boiler 44 and water nozzle 174, as well as a number of other monitoring operations. Additionally, each of the filter holders 66A-D can be advanced to the filter washing station 33 for cleaning by the shower of water from the sprayhead 336, as described above. This ensures that each of the filter holder 66A-D are completely cleaned of coffee grounds prior to being moved to the coffee filling station 28 for a fresh quantity of ground coffee.

Therefore, it is intended that the invention not be limited to the particular embodiment disclosed as the best mode contemplated for carrying out this invention, but that the invention will include all of the embodiments falling within the scope of the appended claims.

I claim:

1. Apparatus for dispensing coffee, comprising:

a coffee filling station for discharging a selected quantity of ground coffee;

a coffee dispensing station including a discharge outlet for emitting heated water, under pressure:

a number of filter units movable with respect to said coffee filling station and said coffee dispensing station, each of said filter units including a filter holder having an inlet, an outlet and a filter disc located between said inlet and outlet, said filter discs each being formed with a number of apertures of selected diameter located within a selected area thereof;

each of said filter units receiving a quantity of ground coffee at said coffee filling station, said filter units being selectively movable from said coffee filling station to said coffee dispensing station to receive heated water therefrom and then dispense brewed coffee into a container.

2. The apparatus of claim 1 in which each of said filter discs has apertures of different size or a different number of apertures compared to the other filter discs.

3. The apparatus of claim 1 in which each of said filter units is positionable with respect to said coffee dispensing station such that ground coffee is discharged into said inlet of said filter holder thereof and rests atop said filter disc of said filter holder.

4. The apparatus of claim 1 further including a controller, a sensor located at said coffee dispensing station and an indicia carried by at least one of said filter holders which is capable of being detected by said sensor, said controller being effective to move said filter units relative to said sensor until the presence of said at least one filter holder carrying said indicia is detected by said sensor, said controller thereafter being effective to position a selected one of said filter holders at said coffee dispensing station to receive ground coffee and then transfer said selected filter holder to said coffee dispensing station.

5. The apparatus of claim 4 in which said indicia is a magnet carried by one of said filter holders.

6. Apparatus for dispensing coffee, comprising:

a coffee filling station for discharging a selected quantity of ground coffee;

a coffee dispensing station including a discharge outlet for emitting heated water, under pressure;

a number of filter units each including an inlet, an outlet, and a filtering member located between said inlet and said outlet, said filtering member of each of said filter units being formed with a number of apertures having a selected size, at least one of the number of apertures and the size of the apertures of each filtering member being different from that of the other filtering members;

said filter units each being movable into position at said coffee dispensing station to receive ground coffee through said inlet thereof, said filter units containing ground coffee being selectively movable to said coffee dispensing station to receive heated water and then dispense brewed coffee from said outlet thereof into a container.

7. The apparatus of claim 6 in which each of said filtering members is a cup-shaped disc formed with a number of round apertures.

8. The apparatus of claim 7 in which said apertures have a diameter of about 0.3 millimeters to produce a first type of coffee.

9. The apparatus of claim 7 in which said apertures have a diameter of about 0.4 millimeters to produce a second type of coffee.

10. The apparatus of claim 7 in which said apertures formed in each of said filtering members are contained within a circular area having a first diameter in order to produce a single cup of coffee.

11. The apparatus of claim 10 in which said apertures formed in each of said filtering members are contained within a circular area having a larger, second diameter in order to produce two cups of coffee simultaneously.

12. Apparatus for dispensing coffee, comprising:

a coffee filling station for discharging a selected quantity of ground coffee;

a coffee dispensing station including a discharge outlet for emitting heated water, under pressure;

a number of filter units, each of said filter units including a filter holder having an inlet, an outlet and a filtering member located between said inlet and outlet, each of said filter units being mounted by a ring connected at one end of a filter mounting arm;

means for selectively moving each of said filter units to said coffee filling station to receive a quantity of ground coffee, and for moving a filter unit containing ground coffee to said coffee dispensing station to receive heated water and then dispense brewed coffee into a container.

13. The apparatus of claim 12 in which said means for selectively moving said filter units comprises:

a housing having an internal cam groove;

means for rotating said housing in at least one direction;

a pinion gear mounted to each of said filter mounting arms at a location spaced from said one end connected to said ring;

a number of rack arms each forms with gear teeth mateable with said pinion gear of one of said filter mounting arms, each of said rack arms carrying a cam movable along said internal cam groove of said housing.

14. The apparatus of claim 13 in which said means for rotating said hub includes:

a controller;

a crank arm mounted to said housing;

a motor drivingly connected to said crank arm and operatively controlled by said controller.

15. The apparatus of claim 14 in which said means for selectively moving said filter units further comprises:

a sensor located at said coffee filling station, said sensor being connected to said controller;

an indicia carried by at least one of said filter units which is detectable by said sensor, said sensor sending a signal to said controller upon detection of said indicia, said controller being operative in response to receipt of said signal to cause said motor to rotate said housing such that a selected filter unit is positioned at said coffee filling station.

16. The apparatus of claim 15 in which said indicia is a magnet.

17. Apparatus for dispensing coffee, comprising:

a coffee filling station for discharging a selected quantity of ground coffee;

a coffee dispensing station including a discharge outlet for emitting heated water, under pressure;

a number of filter units;

filter indexing means for selectively moving each of said filter units to said coffee filling station to receive a quantity of ground coffee, and for thereafter selectively moving each filter unit containing ground coffee to said coffee dispensing station to receive heated water and then dispense brewed coffee;

a filter cleaning station including cleaning means for removing ground coffee from each of said filter units, said cleaning means including;
  (i) a cleaning blade insertable within each filter unit;
  (ii) means for moving said cleaning blade between a retracted position and an extended cleaning position within a filter unit;
  (iii) means for rotating said cleaning blade in said extended, cleaning position to remove ground coffee from said filter unit;

said filter indexing means being operative to move each of said filter units from said coffee dispensing station to said filter cleaning station for cleaning.

18. The apparatus of claim 17 in which said means for moving said cleaning blade comprises:

a base which mounts said cleaning blade;

a rotatable main shaft having a threaded portion, said main shaft being connected to said base by a nut axially movable along said threaded portion of said main shaft in response to rotation thereof;

a telescoping housing mounted to said base and having an interior which receives said main shaft;

said base and said cleaning blade being movable from said retracted position to said extended position upon rotation of said main shaft in a first direction, and being movable from said extended position to said retracted position upon rotation of said main shaft in an opposite, second direction.

19. The apparatus of claim 18 in which said means for rotating said cleaning blade comprises:

a first pulley mounted to said main shaft and being rotatable therewith;

a second pulley fixed to a secondary shaft which mounts said cleaning blade;

a belt extending between said first and second pulleys to transmit rotation of said main shaft to said secondary shaft and cleaning blade.

20. The apparatus of claim 18 in which said main shaft is drivingly connected to the output of a reversible motor.

21. The apparatus of claim 17 in which each of said filter units comprises:

a filter holder formed with an inlet, an outlet and a filtering member located between said inlet and said outlet;

a ring which mounts said filter holder;

a mounting arm connected at one end to said ring, said mounting arm having a pinion gear mounted thereto at a location spaced from said one end.

22. The apparatus of claim 21 in which said filter indexing means including:

a housing having an internal cam groove;

means for rotating said housing in at least one direction;

a number of rack arms each formed with gear teeth mateable with said pinion gear of one of said filter mounting arms, each of said rack arms carrying a cam movable along said internal cam groove of said housing, said internal cam groove having a configuration such that each of said rack arms is moved in a direction which rotates said pinion gear of a respective filter mounting arm to thereby position the associated filter holder such that its inlet faces vertically upwardly at said coffee filling station and at said coffee dispensing station, each of said rack arms being moved by said cam and cam groove in the opposite direction in the course of movement to said filter cleaning station which rotates said pinion gear of a respective filter mounting arm to thereby invert the filter holder such that said inlet thereof faces vertically downwardly.

23. The apparatus of claim 22 in which said cleaning means of said cleaning station enters said filter holder when in said vertically downwardly facing position to remove ground coffee therefrom.

24. The apparatus of claim 17 further including a filter washing station for removing ground coffee remaining in said filter units after leaving said filter cleaning station.

25. The apparatus of claim 24 in which said filter washing station includes at least one spray nozzle operative to direct water into the interior of said filter units.

26. Apparatus for dispensing coffee, comprising:

a coffee filling station for discharging a selected quantity of ground coffee;

a coffee dispensing station;

a number of filter units movable to said coffee filling station to receive a quantity of ground coffee, and then to said coffee dispensing station;

nozzle means, located at said coffee dispensing station, for dispensing heated water, under pressure;

filter handling means, located at said coffee dispensing station, for moving a filter unit into sealing engagement with said nozzle means so that the ground coffee within said filter unit is compacted and then heated water from said nozzle means is dispensed into said filter unit to form brewed coffee.

27. The apparatus of claim 26 in which each of said filter units comprises:

a filter holder including a housing formed with an interior having an inlet and an outlet, said housing being formed with a recess at the base thereof;

a ring which slideably mounts said filter holder;

a mounting arm connected at one end to said ring.

28. The apparatus of claim 27 in which said filter handling means includes:

a bracket engageable with said recess of said filter holder;

a fluid cylinder having a piston connected to said bracket, said cylinder being operative to move said piston to an extended position wherein said bracket and said filter holder are moved vertically upwardly into engagement with said nozzle means, and said cylinder being operative to move said piston to a retracted position in which said filter holder and said nozzle means are disengaged from one another.

29. The apparatus of claim 28 in which said housing of such filter holder is formed with longitudianally extending, external ribs, and said ring is formed with internal grooves, said external ribs of said filter holder being slidable within said grooves of said ring in response to extension and retraction of said piston.

30. The apparatus of claim 28 in which said filter handling means further comprises:

a controller which operates said fluid cylinder;

a first switching means connected to said controller for producing a signal in response to movement of said bracket and filter holder to said extended position;

a second switching means, connected to said controller, for producing a signal in response to movement of said bracket and filter holder to said retracted position.

31. The apparatus of claim 30 in which said bracket is connected to a vertical plate movable therewith, each of said first and second switching means being activated in response to movement of said vertical plate with said bracket and said filter holder.

32. The apparatus of claim 28 further including a pivotal discharge spout located at said coffee dispensing station in alignment with said outlet of said filter holder, said discharge spout being pivotal in response to movement of said bracket and said filter holder to said extended position such that the outlet of said discharge spout faces in a vertically downward direction to direct brewed coffee from said filter holder into a container.

33. Apparatus for dispensing coffee and foamed milk to form cappuccino, comprising:

a coffee filling station for discharging a selected quantity of ground coffee;

a coffee dispensing station including a discharge outlet for emitting heated water, under pressure;

a number of filter units each selectively movable to said coffee filling station to receive ground coffee, and then to said coffee dispensing station to receive heated water and produce brewed coffee;

an emulsifier operative to produce foamed milk, said emulsifier being located relative to said coffee dispensing station so that the brewed coffee emitted from each filter unit and the foamed milk produced by said emulsifier can be directed into the same container.

34. The apparatus of claim 33 further including:

a milk line for interconnecting a milk container with said emulsifier;

a pinch valve connected to said milk line between the milk container and said emulsifier for controlling the flow of milk therebetween.

35. The apparatus of claim 34 further including:

a controller connected to said pinch valve and to a steam valve;

said emulsifier having a housing formed with an air inlet communicating with atmosphere, a steam inlet connected to a source of steam, a milk inlet connected to said milk line, and, an emulsifying chamber having an outlet;

said controller being effective to open said steam valve so that a flow of steam enters said emulsifier housing thereby drawing milk through said milk inlet and air through said air inlet for intermixing within said emulsifier chamber to form foamed milk.

36. The apparatus of claim 35 in which said controller is effective to close said steam valve, close said pinch valve and then re-open said steam valve after allowing milk remaining within said emulsifying chamber to at least partially drip into said outlet thereof so that said emulsifying chamber is substantially cleaned of milk.

37. The apparatus of claim 33 further including a discharge spout located at said coffee dispensing station and connected to said emulsifier, said discharge spout including means for directing brewed coffee and foamed milk into a single container and into two containers.

38. The apparatus of claim 37 in which said discharge spout is formed with an upper portion including an emulsifying chamber and an espresso cavity, and a lower portion including at least one foamed milk passageway and at least one espresso passageway each terminating with a discharge outlet.

39. The apparatus of claim 38 in which said at least one foamed milk passageway and said at least one espresso passageway are each divided in half with each half having a discharge outlet, said discharge outlets being positioned relative to one another so as to direct espresso and foamed milk into two containers positioned side-by-side or into one container centered relative to said discharge outlets.

40. The apparatus of claim 33 in which each of said filter units includes a filter holder having an inlet, an outlet, and a filter disc carried within said filter holder between said inlet and said outlet.

41. The apparatus of claim 40 in which each of said filter discs comprises a cup-shaped section formed within a number of apertures of selected diameter, said apertures being formed along a selected area of each of said cup-shaped sections.

42. The apparatus of claim 41 in which said apertures formed in said cup-shaped disc are contained within a circular area having a first diameter in order to produce a single cup of coffee, or within a circular area having a larger, second diameter in order to produce two cups of coffee simultaneously.

43. The apparatus of claim 40 in which each of said filter units is positionable with respect to said coffee dispensing station such that ground coffee is discharged into said inlet of said filter holder thereof and rests atop said filter disc carried within said filter holder.

44. The apparatus of claim 40 further including a controller, a sensor located at said coffee dispensing station and an indicia carried by at least one of said filter holders which is capable of being detected by said sensor, said controller being effective to move said filter units relative to said sensor until the presence of said at least one filter holder carrying said indicia is detected by said sensor, said controller thereafter being effective to position a selected one of said filter holders at said coffee dispensing station to receive ground coffee and then transfer said selected filter holder to said coffee dispensing station.

45. The apparatus of claim 44 in which said indicia is a magnet carried by one of said filter holders.

46. The apparatus of claim 33 further including indexing means for selectively moving each of said filter units to said coffee filling station and to said coffee dispensing station.

47. The apparatus of claim 46 in which each of said filter units further includes:

a filter holder having an inlet and an outlet;

a ring which mounts said filter holder;

a mounting arm connected at one end to said ring, said mounting arm having a pinion gear mounted thereto at a location spaced from said one end.

48. The apparatus of claim 47 in which said means for selectively moving said filter units comprises:

a housing having an internal cam groove;

means for rotating said housing in at least one direction;

a number of rack arms each formed with gear teeth mateable with said pinion gear of one of said filter mounting arms, each of said rack arms carrying a cam movable along said internal cam groove of said housing.

49. The apparatus of claim 48 in which said means for rotating said housing includes:

a controller;

a crank arm mounted to said housing;

a motor drivingly connected to said crank arm and operatively controlled by said controller.

50. Apparatus for dispensing coffee and foamed milk to form cappuccino, comprising:

a coffee filling station for discharging a selected quantity of ground coffee;

a coffee dispensing station;

a number of filter units movable to said coffee filling station to receive a quantity of ground coffee, and then to said coffee dispensing station;

nozzle means, located at said coffee dispensing station, for dispensing heated water, under pressure;

filter handling means, located at said coffee dispensing station, for moving a filter unit into sealing engagement with said nozzle means so that the ground coffee within said filter unit is compacted and then heated water from said nozzle means is dispensed into said filter unit to form brewed coffee;

an emulsifier operative to produce foamed milk, said emulsifier being located relative to said coffee dispensing station so that brewed coffee emitted from each filter unit and foamed milk produced by said emulsifier can be directed into the same container.

51. The apparatus of claim 50 in which each of said filter units comprises:

a filter holder including a housing formed with an interior having an inlet and an outlet, said housing being formed with a recess at the base thereof;

a ring which slideably mounts said filter holder;

a mounting arm connected at one end to said ring.

52. The apparatus of claim 51 in which said filter handling means includes:

a bracket engageable with said recess of said filter holder;

a fluid cylinder having a piston connected to said bracket, said cylinder being operative to move said piston to an extended position wherein said bracket and said filter holder are moved vertically upwardly into engagement with said nozzle means, and said cylinder being operative to move said piston to a retracted position in which said filter holder and said nozzle means are disengaged from one another.

53. The apparatus of claim 52 in which said housing of such filter holder is formed with longitudianally extending, external ribs, and said ring is formed with internal grooves, said external ribs of said filter holder being slidable within said grooves of said ring in response to extension and retraction of said piston.

54. The apparatus of claim 52 in which said filter handling means further comprises:

a controller which operates said fluid cylinder;

a first switching means connected to said controller for producing a signal in response to movement of said bracket and filter holder to said extended position;

a second switching means, connected to said controller, for producing a signal in response to movement of said bracket and filter holder to said retracted position.

55. The apparatus of claim 54 in which said bracket is connected to a vertical plate movable therewith, each of said first and second switching means being activated in response to movement of said vertical plate with said bracket and said filter holder.

56. The apparatus of claim 52 further including a pivotal discharge spout located at said coffee dispensing station in alignment with said outlet of said filter holder, said discharge spout being pivotal in response to movement of said bracket and said filter holder to said extended position such that the outlet of said discharge spout faces in a vertically downward direction to direct brewed coffee from said filter holder into a container.

57. Apparatus for dispensing coffee and foamed milk to form cappuccino, comprising:

a coffee filling station for discharging a selected quantity of ground coffee;

a coffee dispensing station including a discharge outlet for emitting heated water, under pressure;

a number of filter units;

filter indexing means for selectively moving each of said filter units to said coffee filling station to receive a quantity of ground coffee, and for thereafter selectively moving each filter unit containing ground coffee to said coffee dispensing station to receive heated water and then dispense brewed coffee;

an emulsifier operative to produce foamed milk, said emulsifier being located relative to said coffee dispensing station so that the brewed coffee dispensed from each filter unit and the foamed milk produced by said emulsifier can be directed into the same container;

a filter cleaning station including cleaning means for removing ground coffee from each of said filter units, said filter indexing means being operative to move each of said filter units from said coffee dispensing station to said filter cleaning station for cleaning.

58. The apparatus of claim 57 in which said cleaning means of said filter cleaning station comprises:

a cleaning blade insertable within each filter unit;

means for moving said cleaning blade between a retracted position and an extended, cleaning position within a filter unit;

means for rotating said cleaning blade while in said extended, cleaning position to remove ground coffee from said filter unit.

59. The apparatus of claim 58 in which said means for moving said cleaning blade comprises:

a base which mounts said cleaning blade;

a rotatable main shaft having a threaded portion, said main shaft being connected to said base by a nut axially movable along said threaded portion of said main shaft in response to rotation thereof;

a telescoping housing mounted to said base and having an interior which receives said main shaft;

said base and said cleaning blade being movable from said retracted position to said extended position upon rotation of said main shaft in a first direction, and being movable from said extended position to said retracted position upon rotation of said main shaft in an opposite, second direction.

60. The apparatus of claim 59 in which said means for rotating said cleaning blade comprises:

a first pulley mounted to said main shaft and being rotatable therewith;

a second pulley fixed to a secondary shaft which mounts said cleaning blade;

a belt extending between said first and second pulleys to transmit rotation of said main shaft to said secondary shaft and cleaning blade.

61. The apparatus of claim 59 in which said main shaft is drivingly connected to the output of a reversible motor.

62. The apparatus of claim 57 in which each of said filter units comprises:

a filter holder formed with an inlet and an outlet, and a filtering member located between said inlet and said outlet;

a ring which mounts said filter holder;

a mounting arm connected at one end to said ring, said mounting arm having a pinion gear mounted thereto at a location spaced from said one end.

63. The apparatus of claim 62 in which said filter indexing means including:

a housing having an internal cam groove;

means for rotating said housing in at least one direction;

a number of rack arms each formed with gear teeth mateable with said pinion gear of one of said filter mounting arms, each of said rack arms carrying a cam movable along said internal cam groove of said units, said internal cam groove having a configuration such that each of said rack arms is moved in a direction which rotates said pinion gear of a respective filter mounting arm to thereby position the associated filter holder such that its inlet faces vertically upwardly at said coffee filling station and at said coffee dispensing station, each of said rack arms being moved by said cam and cam groove in the opposite direction in the course of movement to said filter cleaning station which rotates said pinion gear of a respective filter mounting arm to thereby invert the filter holder such that said inlet thereof faces vertically downwardly.

64. The apparatus of claim 63 in which said cleaning means of said cleaning station enters said filter holder when in said vertically downwardly facing position to remove ground coffee therefrom.

* * * * *